United States Patent
Asakura

(10) Patent No.: US 9,866,992 B2
(45) Date of Patent: *Jan. 9, 2018

(54) COMMUNICATION DEVICE

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,054

(22) Filed: Oct. 6, 2016

(65) Prior Publication Data

US 2017/0026783 A1    Jan. 26, 2017

Related U.S. Application Data

(63) Continuation of application No. 13/959,786, filed on Aug. 6, 2013, now Pat. No. 9,485,608.

(30) Foreign Application Priority Data

Aug. 6, 2012   (JP) ................................ 2012-173602

(51) Int. Cl.
*H04B 5/00* (2006.01)
*H04W 4/00* (2009.01)
(Continued)

(52) U.S. Cl.
CPC .......... *H04W 4/008* (2013.01); *H04L 67/104* (2013.01); *H04M 11/007* (2013.01);
(Continued)

(58) Field of Classification Search
CPC ...................................................... H04B 5/00
See application file for complete search history.

(56) References Cited

U.S. PATENT DOCUMENTS

| 7,209,706 B2 | 4/2007 | Fujii et al. |
| 7,346,061 B2 | 3/2008 | Takayama et al. |

(Continued)

FOREIGN PATENT DOCUMENTS

| CN | 101253469 A | 8/2008 |
| CN | 101790183 A | 7/2010 |

(Continued)

OTHER PUBLICATIONS

U.S. Appl. No. 61/601,496,Specification,Feb. 21, 2012.*

(Continued)

*Primary Examiner* — Cindy Trandai
(74) *Attorney, Agent, or Firm* — Banner & Witcoff, Ltd.

(57) ABSTRACT

A communication device may monitor an establishment of a first type of communication link between a communication device and an external device while the communication device is in a first state in which a P2P mode of an NFC standard is active and a first mode of the NFC standard is active. The communication device may send first data to the external device by using the first type of communication link. The first data may include a command for causing the external device to execute an activation of a particular application. The communication device may change the state of the communication device from the first state to a second state in which the P2P mode is active, and perform the two-way communication with the external device that operates the particular application by using a second type of communication link.

9 Claims, 8 Drawing Sheets

(51) Int. Cl.
*H04W 76/04* (2009.01)
*H04L 29/08* (2006.01)
*H04M 11/00* (2006.01)
H04W 12/06 (2009.01)
H04W 84/18 (2009.01)

(52) U.S. Cl.
CPC ............ *H04W 76/04* (2013.01); *H04W 4/001* (2013.01); *H04W 12/06* (2013.01); *H04W 84/18* (2013.01)

(56) References Cited

U.S. PATENT DOCUMENTS

| | | |
|---|---|---|
| 2003/0007606 A1 | 1/2003 | Suder et al. |
| 2004/0116074 A1 | 6/2004 | Fujii et al. |
| 2004/0192264 A1 | 9/2004 | Liu et al. |
| 2005/0077356 A1 | 4/2005 | Takayama et al. |
| 2005/0088709 A1 | 4/2005 | Kizaki et al. |
| 2006/0101280 A1 | 5/2006 | Sakai |
| 2006/0126118 A1 | 6/2006 | Nagata |
| 2007/0190937 A1 | 8/2007 | Takayama |
| 2007/0190939 A1 | 8/2007 | Abel |
| 2007/0230332 A1 | 10/2007 | Fukasawa |
| 2008/0052710 A1 | 2/2008 | Iwai et al. |
| 2008/0084578 A1 | 4/2008 | Walker et al. |
| 2008/0117847 A1 | 5/2008 | Hamada |
| 2008/0218810 A1 | 9/2008 | Itoh |
| 2008/0222711 A1 | 9/2008 | Michaelis |
| 2008/0231900 A1 | 9/2008 | Abe |
| 2008/0232405 A1 | 9/2008 | Gallo |
| 2008/0299907 A1* | 12/2008 | Takayama ............ H04B 5/0031 455/41.2 |
| 2009/0021764 A1 | 1/2009 | Kano |
| 2009/0023476 A1 | 1/2009 | Saarisalo et al. |
| 2009/0024768 A1 | 1/2009 | Maruyama et al. |
| 2009/0033972 A1 | 2/2009 | Kato |
| 2009/0036056 A1 | 2/2009 | Oshima et al. |
| 2009/0052348 A1 | 2/2009 | Kato et al. |
| 2009/0066998 A1 | 3/2009 | Kato |
| 2009/0073482 A1 | 3/2009 | Tsuchiya |
| 2009/0103124 A1 | 4/2009 | Kimura et al. |
| 2009/0147803 A1 | 6/2009 | Takayama |
| 2009/0193500 A1 | 7/2009 | Griffin et al. |
| 2009/0271519 A1 | 10/2009 | Helvick |
| 2010/0050189 A1 | 2/2010 | Sng |
| 2010/0058359 A1 | 3/2010 | Ferlitsch |
| 2010/0069008 A1 | 3/2010 | Oshima et al. |
| 2010/0077031 A1 | 3/2010 | Yoneda et al. |
| 2010/0078471 A1 | 4/2010 | Lin et al. |
| 2010/0078472 A1 | 4/2010 | Lin et al. |
| 2010/0082485 A1 | 4/2010 | Lin et al. |
| 2010/0130127 A1 | 5/2010 | Takayama |
| 2010/0151790 A1 | 6/2010 | Hoeksel et al. |
| 2010/0188695 A1 | 7/2010 | Okigami |
| 2010/0207735 A1 | 8/2010 | Kim |
| 2010/0207742 A1 | 8/2010 | Buhot et al. |
| 2010/0241857 A1 | 9/2010 | Okude et al. |
| 2010/0311330 A1 | 12/2010 | Aibara et al. |
| 2011/0002005 A1 | 1/2011 | Ashmore |
| 2011/0026068 A1 | 2/2011 | Yoshida |
| 2011/0028091 A1 | 2/2011 | Higgins et al. |
| 2011/0065385 A1 | 3/2011 | Geslin et al. |
| 2011/0075186 A1 | 3/2011 | Azuma |
| 2011/0090830 A1 | 4/2011 | Churei |
| 2011/0116125 A1 | 5/2011 | Park |
| 2011/0177780 A1 | 7/2011 | Sato et al. |
| 2011/0210618 A1 | 9/2011 | Takasu |
| 2011/0226853 A1* | 9/2011 | Soh ................... G06K 7/10237 235/380 |
| 2011/0258322 A1 | 10/2011 | Luzzatti et al. |
| 2011/0267636 A1 | 11/2011 | Kamasuka |
| 2011/0292445 A1 | 12/2011 | Kato |
| 2012/0034868 A1 | 2/2012 | Fine et al. |
| 2012/0069772 A1 | 3/2012 | Byrne et al. |
| 2012/0100803 A1 | 4/2012 | Suumaki et al. |
| 2012/0101944 A1 | 4/2012 | Lin et al. |
| 2012/0135681 A1 | 5/2012 | Adams et al. |
| 2012/0166338 A1 | 6/2012 | Agnelli et al. |
| 2012/0297048 A1 | 11/2012 | Hsu |
| 2012/0329390 A1 | 12/2012 | Kim |
| 2013/0009752 A1 | 1/2013 | Finkenzeller et al. |
| 2013/0040565 A1 | 2/2013 | Suzuki |
| 2013/0077124 A1 | 3/2013 | Vojak |
| 2013/0080276 A1 | 3/2013 | Granbery |
| 2013/0083358 A1 | 4/2013 | Suzuki |
| 2013/0165042 A1 | 6/2013 | Gillespie et al. |
| 2013/0166969 A1 | 6/2013 | Zhang et al. |
| 2013/0196595 A1 | 8/2013 | Byrne et al. |
| 2013/0204726 A1 | 8/2013 | Cruttenden et al. |
| 2013/0215467 A1* | 8/2013 | Fein ....................... G06F 3/1204 358/1.15 |
| 2013/0229684 A1* | 9/2013 | Yasuzaki ............ H04N 1/00127 358/1.15 |
| 2013/0229690 A1* | 9/2013 | Sumita ............... H04N 1/00127 358/1.15 |
| 2013/0244578 A1 | 9/2013 | Bacioccola |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1 | 11/2013 | Laracey |
| 2014/0002850 A1 | 1/2014 | Kang |
| 2014/0004793 A1 | 1/2014 | Bandyopadhyay et al. |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1 | 2/2014 | Piratla et al. |
| 2014/0063537 A1 | 3/2014 | Nishikawa et al. |
| 2014/0068719 A1 | 3/2014 | Kiukkonen et al. |
| 2014/0104635 A1 | 4/2014 | Nishikawa |
| 2014/0219453 A1 | 8/2014 | Neafsey et al. |
| 2014/0256251 A1 | 9/2014 | Caceres et al. |
| 2014/0293980 A1 | 10/2014 | Shibata |
| 2014/0304596 A1 | 10/2014 | Chandran et al. |
| 2014/0368859 A1 | 12/2014 | Gutnik et al. |
| 2015/0093992 A1 | 4/2015 | Tanaka |
| 2015/0126115 A1 | 5/2015 | Yun et al. |
| 2015/0189595 A1 | 7/2015 | Shibao |
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0220290 A1 | 8/2015 | Park et al. |
| 2015/0270912 A1 | 9/2015 | Dhayni et al. |
| 2015/0317116 A1 | 11/2015 | Suzuki et al. |
| 2015/0327172 A1 | 11/2015 | Kusakabe |
| 2015/0350905 A1 | 12/2015 | Suzuki |

FOREIGN PATENT DOCUMENTS

| | | |
|---|---|---|
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 2007-166538 A | 6/2007 |
| JP | 2009-037566 A | 2/2009 |
| JP | 2009-135865 A | 6/2009 |
| JP | 2011-044092 A | 3/2011 |
| JP | 2011073272 A | 4/2011 |
| JP | 2011-146991 A | 7/2011 |
| JP | 2013187565 A | 9/2013 |
| JP | 2013-214139 A | 10/2013 |
| JP | 2013-214804 A | 10/2013 |
| WO | 2005/017738 A1 | 2/2005 |

OTHER PUBLICATIONS

Jul. 7, 2010—NFC Forum Connection Handover Technical Specification 1.2.
Nov. 17, 2010—"NFC Digital Protocol," NFCForum-TS-DigitalProtocol-1.0.
Aug. 31, 2011—"Simple NDEF Exchange Protocol"—Technical Specification, SNEP 1.0, pp. 1-20.

(56) References Cited

OTHER PUBLICATIONS

Aug. 31, 2011—NFC Forum, Simple NDEF Exchange Protocol Technical Specification, NFC Forum, SNEP 1.0, NFCForum-TS-SNEP_1.0.
Aug. 31, 2011—NFC Forum Simlple NDEF Exchange Protocol.
Jul. 4, 2012, Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012, —Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
U.S. Appl. No. 61/601,496, filed Feb. 21, 2012, Drawings.
U.S. Appl. No. 61/601,496, filed Feb. 21, 2012, Specification.
Jul. 2, 2013—Co-pending U.S. Appl. No. 13/933,419.
Jul. 23, 2013—(EP) Extended Search Report—Application No. 13161732.6.
Mar. 15, 2013—Co-Pending U.S. Appl. No. 13/834,434.
Sep. 23, 2013—(EP) Search Report—App 13174778.4.
Aug. 5, 2014—U.S. Non-Final Office Action—U.S. Appl. No. 13/933,419.
Dec. 12, 2014—U.S. Notice of Allowance—U.S. Appl. No. 13/834,423.
Jan. 17, 2014—(EP) Extended Search Report—App 13179154.3.
Jan. 17, 2014—(EP) Extended Search Report—App 13179157.6.
Jan. 17, 2014—(EP) Search Report—Application No. 13179289.7.
Mar. 13, 2014—Co-pending U.S. Appl. No. 14/208,220.
May 9, 2014—U.S. Non-Final Office Action—U.S. Appl. No. 13/833,236.
May 9, 2014—U.S. Non-Final Office Action—U.S. Appl. No. 13/834,423.
Nov. 26, 2014—U.S. Notice of Allowance—U.S. Appl. No. 13/933,419.
Oct. 20, 2014—U.S. Notice of Allowance—U.S. Appl. No. 13/833,236.
Oct. 27, 2014—(EP) Office Action—App 13159607.4.
Sep. 4, 2014—U.S. Final Office Action—U.S. Appl. No. 13/834,423.
Apr. 15, 2015—U.S. Non-Final Office Action—U.S. Appl. No. 13/959,786.
Aug. 31, 2015—U.S. Non-Final Office Action—U.S. Appl. No. 14/663,923.
Dec. 17, 2015—U.S. Notice of Allowance—U.S. Appl. No. 13/957,479.
Dec. 22, 2015—(CN) Notification of First Office action—App 201310339554.X—Eng Tran.
Dec. 22, 2015—(JP) Notification of Reasons for Rejection—App 2012-082818—Eng Tran.
Feb. 12, 2015—U.S. Non-Final Office Action—U.S. Appl. No. 13/957,490.
Feb. 13, 2015—U.S. Non-Final Office Action—U.S. Appl. No. 13/957,479.
Jul. 13, 2015—U.S. Final Action—U.S. Appl. No. 13/957,479.
Jul. 16, 2015—U.S. Final Office Action—U.S. Appl. No. 13/957,490.
Mar. 26, 2015—Co-pending U.S. Appl. No. 14/669,553.
Mar. 31, 2015—U.S. Notice of Allowance—U.S. Appl. No. 13/834,423.
Mar. 6, 2015—(CN) Notification of First Office Action—App 201310097370.7.
May 22, 2015—U.S. Non-Final Office Action—U.S. Appl. No. 13/834,434.
Oct. 2, 2015—(US)—Final Office Action—U.S. Appl. No. 13/959,786.
Oct. 8, 2015—(EP) Extended European Search Report—App 15169695.2.
Oct. 9, 2015—U.S. Non-Final Office Action—U.S. Appl. No. 14/706,368.
Oct. 14, 2015—(EP) Office Action—App 13179157.6.
Sep. 30, 2015—U.S. Notice of Allowance—U.S. Appl. No. 14/208,220.
Apr. 26, 2016—U.S. Non-Final Office Action—U.S. Appl. No. 13/959,786.
Aug. 11, 2016—U.S. Notice of Allowance—U.S. Appl. No. 13/959,786.
Aug. 23, 2016—U.S. Non-Final Office Action—U.S. Appl. No. 14/498,213.
Aug. 24, 2016—U.S. Notice of Allowance—U.S. Appl. No. 14/208,220.
Aug. 25, 2016—U.S. Non-Final Office Action—U.S. Appl. No. 13/834,434.
Aug. 9, 2016—U.S. Notice of Allowance—U.S. Appl. No. 13/957,479.
Feb. 17, 2016—U.S.—Final Office Action—U.S. Appl. No. 14/706,368.
Nov. 3, 2016—U.S. Non-Final Office Action—U.S. Appl. No. 15/162,995.
Nov. 2, 2016—U.S. Non-Final Office Action—U.S. Appl. No. 14/669,553.
Nov. 18, 2016—U.S. Notice of Allowance—U.S. Appl. No. 14/208,220.
Dec. 6, 2016—U.S. Notice of Allowance—U.S. Appl. No. 14/706,368.
Dec. 2, 2016—U.S. Notice of Allowance—U.S. Appl. No. 13/957,479.
Dec. 22, 2016—U.S. Notice of Allowance—U.S. Appl. No. 13/957,490.
Jan. 10, 2017—U.S. Notice of Allowance—U.S. Appl. No. 13/834,434.
Nov. 25, 2016—(CN) Office Action—App 201310084346.X—Eng Tran.
Feb. 7, 2017—(JP) Notification of Reasons for Rejection—App 2013-204535—Eng Trans.
Mar. 1, 2017—U.S. Notice of Allowance—U.S. Appl. No. 15/162,995.
Mar. 3, 2017—U.S. Notice of Allowance—U.S. Appl. No. 15/132,432.
Mar. 30, 2017—U.S. Notice of Allowance—U.S. Appl. No. 15/283,829.
Feb. 25, 2016—U.S. Final Office Action—U.S. Appl. No. 13/834,434.
Jan. 12, 2016—(JP) Notification of Reasons for Rejection—App 2012-082819—Eng Tran.
Jan. 25, 2016—U.S. Non-Final Office Action—U.S. Appl. No. 13/957,490.
Jan. 29, 2016—U.S. Notice of Allowance—U.S. Appl. No. 14/663,923.
Jun. 20, 2016—U.S. Final Office Action—U.S. Appl. No. 13/957,490.
Jun. 22, 2016—U.S. Notice of Allowance—U.S. Appl. No. 14/706,368.
Mar. 1, 2016—(JP) Notice of Reasons for Rejection—App 2012-193091—Eng Tran.
Mar. 8, 2016—(JP) Notification of Reasons for Rejection—App 2012-173269.
May 3, 2016—(CN) Office Action—App 201310084346.X—Eng Tran.
May 6, 2016—U.S. Non-Final Office Action—U.S. Appl. No. 13/957,479.
May 6, 2016—U.S. Non-Final Office Action—U.S. Appl. No. 14/208,220.
May 11, 2016—U.S. Notice of Allowance—U.S. Appl. No. 14/706,368.
May 17, 2016—(JP) Notification of Reasons for Rejection—App 2012-082818—Eng Trans.
Sep. 6, 2016—U.S. Non-Final Office Action—U.S. Appl. No. 15/132,432.

(56) References Cited

OTHER PUBLICATIONS

Anonymous,:"Near Field Communication White Paper", Feb. 12, 2004, URL:http://www.ecma-international.org/activities/Communications/2004tg19-001.pdf [retrieved on Mar. 6, 2006].

Information Technology—Telecommunications and information exchange between systems—Near Field Communication—Interface and Protocol (NFCIP-1), ISO/IEC 18092, Second edition, Mar. 15, 2013.

Information Technology—Telecommunications and information exchange between systems—Near Field Communication Interface and Protocol-2 (NFCIP-2), ISO/IEC 21481, Second edition, Jul. 1, 2012.

Nosowitz, D., "Everything You Need to Know about Near Field Communication," Popular Science, posted Mar. 1, 2011.

Requirement for Election issued in U.S. Appl. No. 13/834,423, dated Feb. 24, 2014.

Smart Cards; UICC-CLF interface; Host Controller Interface P2P LNC Protocol, Vo. 1.0, Jan. 11, 2008, pp. 1-33.

Wi-Fi Peer-to-Peer (P2P) Technical Specification Version 1.1 2010, pp. 1-159.

May 16, 2017—U.S. Notice of Allowance—U.S. Appl. No. 14/706,368.

Jun. 1, 2017—U.S. Notice of Allowance—U.S. Appl. No. 13/834,434.

Jun. 1, 2017—U.S. Notice of Allowance—U.S. Appl. No. 15/283,829.

Jul. 18, 2017—(JP) Notification of Rejection—App 2016-156230—Eng Tran.

Aug. 1, 2017—U.S. Notice of Allowance—U.S. Appl. No. 14/669,553.

Aug. 2, 2017—(EP) Office Action—App 13174778.4.

Jul. 27, 2017—(EP) Office Action—App 13161732.6.

Aug. 15, 2017—U.S. Non-Final Office Action—U.S. Appl. No. 14/498,213.

Mar. 23, 2017—U.S. Final Office Action—U.S. Appl. No. 14/669,553.

Apr. 21, 2017—U.S. Final Office Action—U.S. Appl. No. 14/498,213.

\* cited by examiner (Second Embodiment; Case B4)

COMMUNICATION DEVICE

CROSS-REFERENCE TO RELATED APPLICATIONS

This application is a continuation of U.S. patent application Ser. No. 13/959,786 filed Aug. 6, 2013, which claims priority to Japanese Patent Application No. 2012-173602, filed on Aug. 6, 2012, the contents of which are hereby incorporated by reference into the present applications.

TECHNICAL FIELD

The technology disclosed in the present specification relates to a communication device that performs a two-way communication with an external device according to an NFC (an abbreviation of Near Field Communication) scheme.

DESCRIPTION OF RELATED ART

A system comprising a communication terminal and an NFC device is known. In a state where an application is active, the communication terminal shifts to a R/W mode when a data read operation is performed by a user. In a state where the communication terminal is in the R/W mode and the NFC device is in a passive tag mode, a data read request is sent from the communication terminal to the NFC device. Next, each of the communication terminal and the NFC device shifts to a P2P mode. In a state where the communication terminal is in the P2P mode and the NFC device is in the P2P mode, data is transferred from the NFC device to the communication terminal. When data transfer completes, the communication terminal shifts to the passive tag mode, and the NFC device shifts to the R/W mode.

SUMMARY

In the technique described above, when a data communication is to be performed between the communication terminal and the NFC device, it is assumed that an application of the communication terminal is active, and a situation is not considered in which the application of the communication terminal is not active.

In the present specification, a situation is considered in which an application of the external device is not active, and a technique is disclosed for appropriately performing a two-way communication of target data between a communication device and an external device.

One aspect of the technique disclosed in the present specification may be a communication device configured to perform a two-way communication with an external device according to an NFC (Near Field Communication) scheme complying with an NFC standard. The communication device may comprise: an NFC interface configured to operate in the NFC scheme; a processor; and a memory configured to store computer executable instructions. The computer executable instructions, when executed by the processor, may cause the communication device to execute: monitoring an establishment of a first type of communication link between the communication device and the external device while the communication device is in a first state in which a P2P (Peer to Peer) mode of the NFC standard is not active and a first mode of the NFC standard is active, the first type of communication link being for performing a data communication between the communication device in the first mode and the external device in a second mode of the NFC standard; sending first data to the external device via the NFC interface by using the first type of communication link, in a case where the first type of communication link is established while the communication device is in the first state, the first data including a command for causing the external device to execute an activation of a particular application, the particular application being for performing the two-way communication; changing, at a predetermined timing after sending the first data, a state of the communication device from the first state to a second state in which the P2P mode is active; performing the two-way communication with the external device, that operates the particular application, via the NFC interface by using a second type of communication link, in a case where the second type of communication link is established between the communication device and the external device while the communication device is in the second state, the second type of communication link being for performing a data communication between the communication device in the P2P mode and the external device in the P2P mode.

Note that a controlling method, computer executable instructions, and a non-transitory computer readable medium for storing the computer executable instructions which are for realizing the communication device described above are newly useful. A communication system including the communication device and the external device is also newly useful.

EMBODIMENT

First Embodiment (Configuration of Communication System 2)

Figure 1:
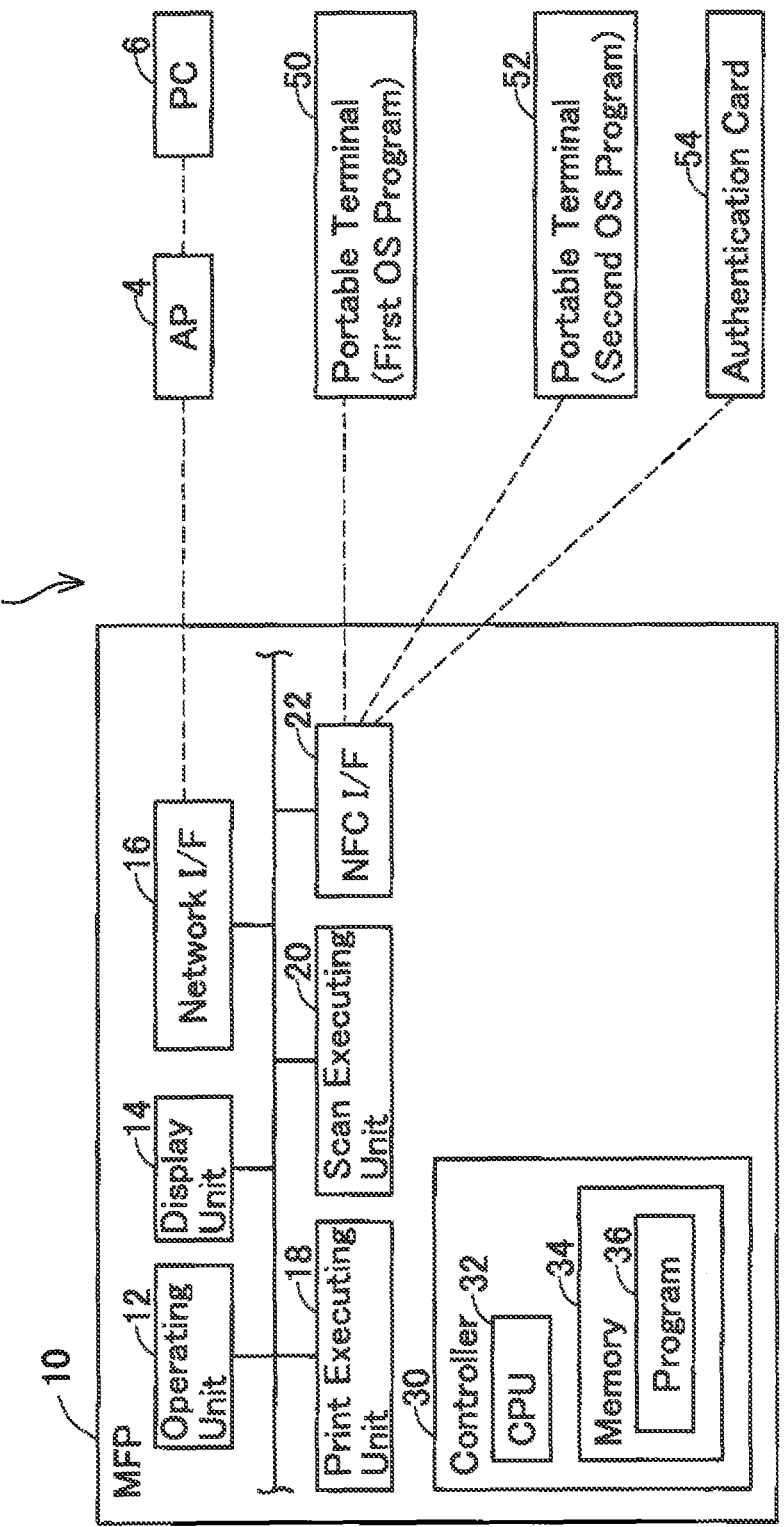
FIG. 1 shows the configuration of a communication system.

As shown in FIG. 1, a communication system 2 comprises an AP (an abbreviation of Access Point) 4, a PC (an abbreviation of Personal Computer) 6, a multi-function peripheral (called "MFP (an abbreviation of Multi-Function Peripheral)" below) 10, portable terminals 50, 52, and an authentication card 54. The MFP 10, the portable terminals 50, 52, and the authentication card 54 are each capable of performing a communication of a communication scheme of the NFC standard (i.e., an NFC scheme). In the present embodiment, the NFC standard is international standard ISO/IEC21481 or ISO/IEC18092. The communication of the NFC scheme is a wireless communication using 13.56 MHz band radio waves. Further, the MFP 10 and the portable terminals 50, 52 are each capable of performing a wireless communication using a communication network different from a communication link of the NFC scheme.

(Configuration of MFP 10)

The MFP 10 has an operating unit 12, a display unit 14, a network interface (described as "I/F," hereinafter) 16, a print executing unit 18, a scan executing unit 20, an NFC I/F 22, and a controller 30.

The operating unit 12 comprises a plurality of keys. A user can input various commands to the MFP 10 by operating the operating unit 12. The display unit 14 is a display for displaying various information. The network I/F 16 is an I/F for connecting with a wireless network. Moreover, this wireless network is a network for performing a wireless communication different from the communication of the NFC scheme, being e.g., a network complying with IEEE (an abbreviation of The Institute of Electrical and Electronics Engineers, Inc.) standard 802.11 and standards conforming thereto (e.g., 802.11a, 11b, 11g, 11n, etc.). In the present embodiment, the wireless network is a network including the AP 4, the PC 6 and the MFP 10. The print executing unit 18 is an ink jet method, laser method, etc. printing mechanism. The scan executing unit 20 is a CCD, CIS, etc. scanning mechanism.

The NFC I/F 22 is an interface for executing the NFC scheme communication. The NFC I/F 22 is configured by a chip different from the network I/F 16. The network I/F 16 and the NFC I/F 22 differ from each other in terms of the following points.

In other words, the speed of wireless communication using the network I/F 16 is higher than the speed of wireless communication using the NFC I/F 22. The frequency of a carrier wave in the wireless communication performed using the network I/F 16 is different from the frequency of a carrier wave in the wireless communication performed using the NFC I/F 22. When the distance between the MFP 10 and the portable device 50 is approximately 10 cm or less, the MFP 10 can execute the NFC scheme communication with the portable device 50 using the NFC I/F 22. On the other hand, even when the distance between the MFP 10 and the portable device 50 is equal to or greater than 10 cm, or equal to or less than 10 cm, the MFP 10 can execute the wireless communication with the portable device 50 using the network I/F 16. In other words, the maximum distance in which the MFP 10 can execute the wireless communication with a communication-destination device (e.g., the portable device 50) via the network I/F 16 is greater than the maximum distance in which the MFP 10 can execute the wireless communication with the communication-destination device via the NFC I/F 22. It should be noted that the wireless communication using the network I/F 16 is referred to as "network wireless communication" hereinafter.

The controller 30 has a CPU 32 and a memory 34. The CPU 32 executes various processes in accordance with program 36 stored in the memory 34. The memory 34 is configured by a ROM, a RAM, a hard disk, and the like. The memory 34 stores therein the program 36 that is executed by the CPU 32.

The program 36 includes an application program and a protocol stack. The application program is a program executed by the CPU 32 to process an application layer of the OSI reference model. The protocol stack is a program executed by the CPU 32 to process a layer lower than the application layer of the OSI reference model. The protocol stack includes a P2P (an abbreviation of Peer to Peer) program, a R/W program, and a CE program. The P2P program is a program for executing a process according to a P2P-mode of the NFC standard. The R/W program is a program for executing a process according to a Reader/Writer-mode of the NFC standard. The CE program is a program for executing a process according to a CE (an abbreviation of Card Emulation) mode of the NFC standard. These programs are used for executing processes complying with the NFC standards defined by the NFC forum.

Below, a device capable of performing a communication of the NFC scheme (the MFP 10, the portable terminals 50, 52, the authentication card 54, etc.) is called an "NFC device". Further, below, Reader mode and Writer mode combined may be described briefly as "R/W mode".

NFC devices include devices capable of using all three modes P2P mode, R/W mode, and CE mode, and devices capable of using only one or two modes of the three modes. In the present embodiment, the MFP 10 and the portable terminal 52 are devices capable of using all three modes. However, the portable terminal 50 is capable of using the P2P mode and R/W mode, but is not capable of using the CE mode. Further, the authentication card 54 is a card of the NFC standard. More specifically, the authentication card 54 is capable of using the CE mode, but is not capable of using the P2P mode and the R/W mode.

The P2P mode is a mode for performing a two-way communication between a pair of NFC devices. For example, a situation is assumed in which the P2P mode is active in both a first NFC device and a second NFC device. In this case, a communication link corresponding to the P2P mode (called "communication link of P2P" below) is established between the first NFC device and the second NFC device. In this case, e.g., the first NFC device sends first data to the second NFC device by using the communication link of P2P. Then, the second NFC device sends second data to the first NFC device by using the same communication link of P2P. Thereby, a two-way communication is realized. An NFC device which is ISO/IEC 1443 Type A, and an NFC device which is ISO/IEC 18092 Type F, these being determined by the NFC Forum, are capable of using the P2P mode, whereas an NFC device which is ISO/IEC 1443 Type B is not capable of using the P2P mode.

The R/W mode and the CE mode are modes for performing a one-way communication between a pair of NFC devices. The CE mode is a mode for an NFC device to operate as a "card", this being a format determined by the NFC Forum. Any Type A NFC device, Type F NFC device, and Type B NFC device is capable of using the CE mode. The Reader mode is a mode for reading data from an NFC device operating as a card in the CE mode. The Writer mode is a mode for writing data to an NFC device operating as a card in the CE mode. Moreover, in the Reader mode, data can also be read from a card of the NFC standard (i.e., the authentication card 54). Further, in the Writer mode, data can also be written to a card of the NFC standard.

For example, a situation is assumed in which the Reader mode is active in the first NFC device, and the CE mode is active in the second NFC device. In this case, a communication link corresponding to the Reader mode and the CE mode is established between the first NFC device and the second NFC device. In this case, using the communication link, the first NFC device executes an operation for reading data from a pseudo card within the second NFC device, thereby receiving the data from the second NFC device.

Further, e.g., a situation is assumed in which the Writer mode is active in the first NFC device, and the CE mode is active in the second NFC device. In this case, a communication link corresponding to the Writer mode and the CE mode is established between the first NFC device and the second NFC device. In this case, using the communication link, the first NFC device executes an operation for writing data to the pseudo card within the second NFC device, thereby sending the data to the second NFC device.

As described above, various combinations of modes can be considered for a pair of NFC devices to execute a communication of the NFC scheme. For example, the following five patterns can be considered as combinations of modes of the pair of NFC devices: "P2P mode, P2P mode", "Reader mode, CE mode", "Writer mode, CE mode", "CE mode, Reader mode", "CE mode, Writer mode".

Moreover, the NFC device cannot form a state in which both the Reader mode and the Writer mode are active. That is, in the NFC device, if the Reader mode is active, the Writer mode is stopped. Further, in the NFC device, if the Writer mode is active, the Reader mode is stopped.

Further, the NFC device can establish a communication link corresponding to a mode that is active, but cannot establish a communication link corresponding to a mode that is not active. For example, in the MFP 10, in a case where the CE mode is active, and the P2P mode and the R/W mode are not active, the MFP 10 can establish a communication link for the MFP 10 to operate in the CE mode, but cannot establish another communication link (i.e., a communication link for the MFP 10 to operate in the P2P mode, the Reader mode, or the Writer mode).

When power of the MFP 10 is turned ON, the MFP 10 shifts to an initial state in which only the CE mode is active, and the P2P mode and the R/W mode are not active. Upon receiving a P2P activation command (to be described) (YES in S32 of FIG. 2), the MFP 10 shifts from the initial state to a state in which only the P2P mode is active, and the R/W mode and the CE mode are not active (S36). Moreover, while the power of the MFP 10 is ON, the MFP 10 maintains a state in which the R/W mode is not active. Consequently, in a variant, the MFP 10 need not be capable of using the R/W mode.

(Configuration of Portable Terminals 50, 52)

The portable terminals 50, 52 are transportable terminals such as, e.g., a mobile phone (e.g., smart phone), PDA, notebook PC, tablet PC, portable music playback device, portable film playback device, etc. The portable terminals 50, 52 each comprise a network I/F and an NFC I/F for connecting with a wireless network. Consequently, the portable terminals 50, 52 are each capable of performing a wireless communication with the MFP 10 via the network I/F, and a wireless communication with the MFP 10 by using the NFC I/F.

An application program (called "application for MFP" below) for causing the MFP 10 to execute various functions (e.g., print function, scan function, etc.) can be installed on each of the portable terminals 50, 52. Moreover, in the present embodiment, the application for MFP is installed on the portable terminals 50, 52 from an internet server (not shown) provided by a vendor of the MFP 10.

As described above, in the present embodiment, the portable terminal 50 is capable of using the P2P mode and the R/W mode, but is not capable of using the CE mode. The portable terminal 50 comprises a first OS (an abbreviation of Operation System) program. The first OS program is, e.g., version 4.0 of Android (registered trademark). The first OS program causes the portable terminal 50 to operate as follows. That is, when power of the portable terminal 50 is turned ON, the portable terminal 50 shifts to an initial state in which the P2P mode and the Reader mode are active, and the Writer mode is not active. In a case where the application for MFP has not been installed, the portable terminal 50 maintains the initial state. In a case where the application for MFP is not active although the application for MFP has been installed, the portable terminal 50 maintains the initial state. Upon activation of the application for MFP, the portable terminal 50 shifts from the initial state to a state in which the P2P mode and the Writer mode are active, and the Reader mode is not active.

Further, as described above, the portable terminal 52 is capable of using the P2P mode, the R/W mode, and the CE mode. The portable terminal 52 comprises a second OS program different from the first OS program. The second OS program operates the portable terminal 52 as follows. That is, when power of the portable terminal 52 is turned ON, the portable terminal 52 shifts to an initial state in which the P2P mode, the Reader mode, and the CE mode are active, and the Writer mode is not active. In a case where the application for MFP has not been installed, the portable terminal 52 maintains the initial state. In a case where the application for MFP is not active although the application for MFP has been installed, the portable terminal 52 maintains the initial state. Upon activation of the application for MFP, the portable terminal 52 shifts from the initial state to a state in which the P2P mode, the Writer mode, and the CE mode are active, and the Reader mode is not active.

Moreover, the AP 4, the PC 6, and the authentication card 54 are used in a second embodiment, to be described. Consequently, a description of these devices is omitted here.

(Poll Operation and Listen Operation)

Next, a Poll operation and a Listen operation executed by the NFC device will be described. For example, in the MFP 10, the CPU 32 does not execute the Poll operation and the Listen operation according to the program 36, but the NFC I/F 22 executes the Poll operation and the Listen operation. The Poll operation is an operation in which a polling signal is sent, and a response signal in response to the polling signal is received. Further, the Listen operation is an operation in which a polling signal is received, and a response signal in response to the polling signal is sent.

The NFC I/F 22 of the MFP 10 is capable of operating in any mode of Poll mode for executing the Poll operation, Listen mode for executing the Listen operation, and a mode in which neither the Poll operation nor the Listen operation are executed (called "non-execution mode" below). The NFC I/F 22 operates sequentially in the Poll mode, the Listen mode, and the non-execution mode. For example, the NFC I/F 22 executes one set of operations in which the NFC I/F 22 operates in the Poll mode, then operates in the Listen mode, and then operates in the non-execution mode. The NFC I/F 22 repeatedly executes the one set of operations.

In the Poll mode, the NFC I/F 22 sends a polling signal, and monitors whether a response signal is received. Specifically, the NFC I/F 22 repeats the following operation: (1) sending a polling signal to which a Type A NFC device can respond (i.e., a polling signal corresponding to Type A), and monitoring reception of a response signal for a predetermined time, (2) if not receiving a response signal, sending a polling signal to which a Type B NFC device can respond (i.e., a polling signal corresponding to Type B), and monitoring reception of a response signal for a predetermined time and, (3) if not receiving a response signal, sending a polling signal to which a Type F NFC device can respond (i.e., a polling signal corresponding to Type F), and monitoring reception of a response signal for a predetermined time. In a case where the NFC I/F 22 receives a response signal from an NFC device within the predetermined time, the NFC device can be said to be of a Type of NFC device corresponding to the polling signal received immediately prior to sending the response signal. In case of the NFC I/F 22 receiving the response signal, further, the NFC device that is the source of the response signal sends, to the NFC device, a query signal for enquiring which mode is active. Consequently, the NFC I/F 22 receives an activation mode signal from the NFC device. The activation mode signal indicates that both the P2P mode and the CE mode are active in the NFC device, that only the P2P mode is active, or that only the CE mode is active.

In the Listen mode, the NFC I/F 22 monitors whether a polling signal is received and, upon receiving the polling signal, sends a response signal. The NFC I/F 22 sends a response signal to the NFC device that is the source of the polling signal only in case of receiving a polling signal of the Type corresponding to the NFC I/F 22. In case of sending the response signal to the NFC device, the NFC I/F 22 further receives a query signal from the NFC device, and sends an activation mode signal to the NFC device.

In the non-execution mode, the NFC I/F 22 does not send a polling signal and, further, does not send a response signal even if receiving a polling signal.

Each of the portable terminals 50, 52 also repeatedly executes the aforementioned one set of operations. Consequently, e.g., in a case where distance between the MFP 10 and the portable terminal 50 is less than 10 cm and a period in which the NFC I/F 22 of the MFP 10 is operating in the Poll mode matches a period in which the portable terminal 50 is operating in the Listen mode, the NFC I/F 22 executes the Poll operation of sending a polling signal to the portable terminal 50 and receiving a response signal from the portable terminal 50. Further, e.g., in a case where distance between the MFP 10 and the portable terminal 50 is less than 10 cm and a period in which the NFC I/F 22 is operating in the Listen mode matches a period in which the portable terminal 50 is operating in the Poll mode, the NFC I/F 22 executes the Listen operation of receiving a polling signal from the portable terminal 50 and sending a response signal to the portable terminal 50. Moreover, below, the NFC device which executed the Poll operation, and the NFC device which executed the Listen operation are called "Poll device" and "Listen device" respectively.

In a case where the NFC I/F 22 executes the Poll operation, i.e., in a case where the MFP 10 is the Poll device, processes for subsequent communication are taken over by the CPU 32. Specifically, first, information is delivered from the NFC I/F 22 to the CPU 32, this information indicating the mode in which the NFC device that is the Listen device (e.g., the portable terminal 50) is capable of executing operation (i.e., information indicating the received activation mode signal). The CPU 32 decides the mode in which the MFP 10 is to operate based on a current state of the MFP 10 (i.e., the mode which is currently active in the MFP 10) and the information delivered from the NFC I/F 22. Specifically, the CPU 32 decides, in the following manner, the mode in which the MFP 10, this being the Poll device, is to operate.

In the NFC standard, the Poll device is capable of operating in the P2P mode or the R/W mode, but is not capable of operating in the CE mode. Consequently, in case the MFP 10 is the Poll device, the CPU 32 decides that the MFP 10 is to operate in the P2P mode or the R/W mode. For example, in case the current state of the MFP 10, which is the Poll device, is a state where the P2P mode is active and the R/W mode is not active, and the information delivered from the NFC I/F 22 indicates that the P2P mode is active in the NFC device, which is the Listen device, the CPU 32 decides that the MFP 10 is to operate in the P2P mode. In this case, the CPU 32 sends an Activation command corresponding to the P2P mode to the NFC device, and receives an OK command from the NFC device. Thereby, a P2P mode communication link is established between the MFP 10, which is the Poll device, and the NFC device, which is the Listen device. Moreover, in the present embodiment, the R/W mode cannot be activated in the MFP 10, and consequently the CPU 32 does not decide that the MFP 10 is to operate in the R/W mode.

Further, in a case, also, where the NFC I/F 22 executes the Listen operation, i.e., in case the MFP 10 is the Listen device, processes for subsequent communication are taken over by the CPU 32. The CPU 32 decides the mode in which the MFP 10 is to operate based on an Activation signal received from the NFC device, which is the Poll device. Specifically, the CPU 32 decides, in the following manner, the mode in which the MFP 10, this being the Listen device, is to operate.

In the NFC standard, the Listen device is capable of operating in the P2P mode or the CE mode, but is not capable of operating in the R/W mode. Consequently, in the case where the MFP 10 is the Listen device, the CPU 32 decides that the MFP 10 is to operate in the P2P mode or the CE mode. For example, in case the current state of the MFP 10, which is the Listen device, is a state where the P2P mode is active and the CE mode is not active, and a current state of the NFC device, which is the Poll device, is a state where the P2P mode is active, the CPU 32 receives an Activation command corresponding to the P2P mode from the NFC device. In this case, the CPU 32 decides that the MFP 10 is to operate in the P2P mode, and sends an OK command to the NFC device. Thereby, a communication link of P2P is established between the MFP 10, which is the Listen device, and the NFC device, which is the Poll device.

Further, e.g., in case the current state of the MFP 10, which is the Listen device, is a state in which the CE mode is active and the P2P mode is not active, and the current state of the NFC device, which is the Poll device, is a state in which the Reader mode or the Writer mode is active, the CPU 32 receives an Activation command corresponding to the R/W mode from the NFC device. In this case, the CPU 32 decides that the MFP 10 is to operate in the CE mode, and sends an OK command to the NFC device. Thereby, a communication link corresponding to the CE mode and the R/W mode is established between the MFP 10, which is the Listen device, and the NFC device, which is the Poll device.

Moreover, in case the communication link corresponding to the CE mode and the R/W mode is established, the CPU 32 further receives information from the NFC device indicating whether the NFC device is operating in the Reader mode or the Writer mode. Consequently, e.g., in case of receiving information indicating that the NFC device is operating in the Reader mode, a communication link corresponding to the CE mode and the Reader mode can be said to be established between the MFP 10, which is the Listen device, and the NFC device, which is the Poll device (called "communication link of MFP (CE)-NFC device (R)" below). Further, e.g., in case of receiving information indicating that the NFC device is operating in the Writer mode, a communication link corresponding to the CE mode and the Writer mode can be said to be established between the MFP 10, which is the Listen device, and the NFC device, which is the Poll device, (called "communication link of MFP (CE)-NFC device (W)" below).

Figure 2:
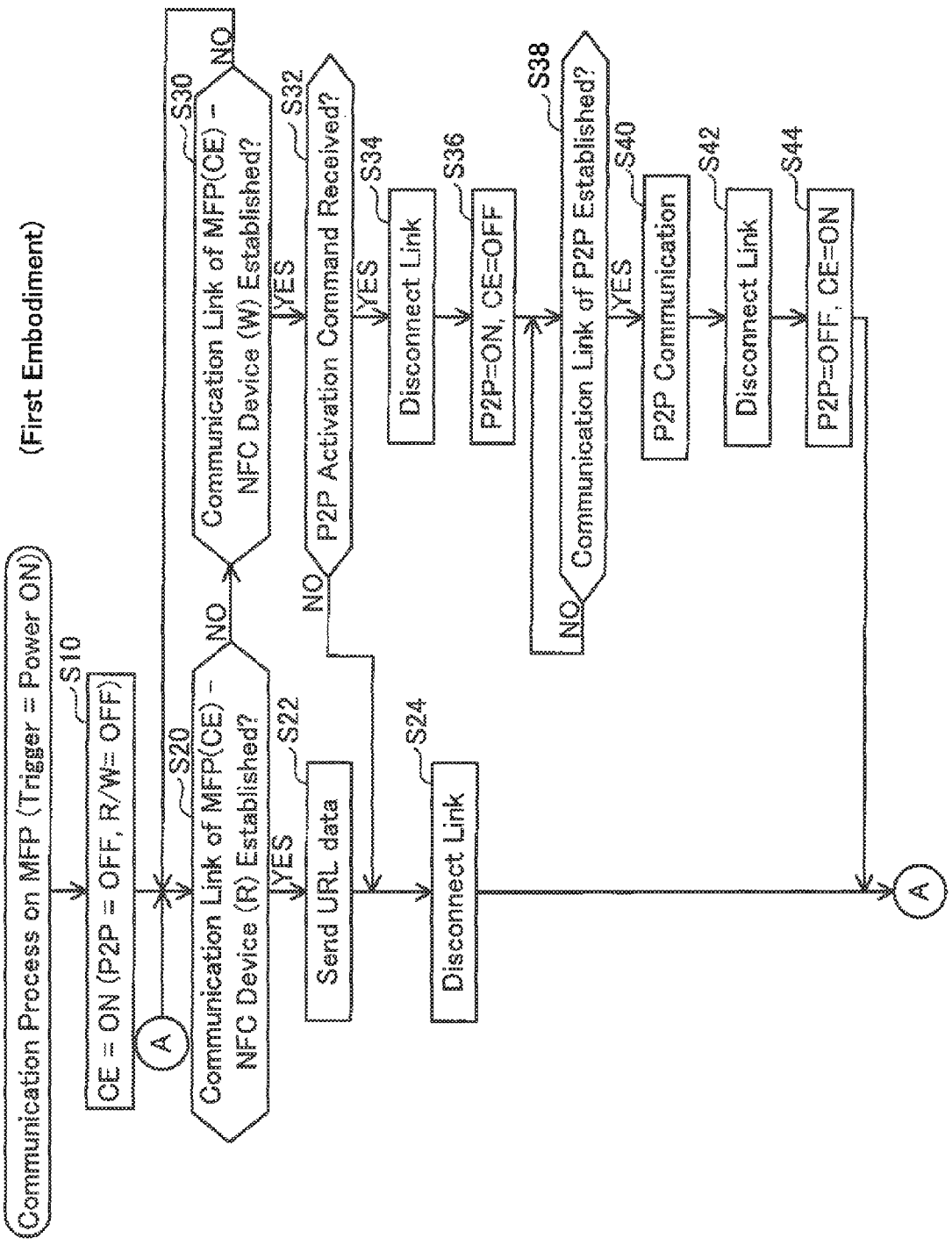
FIG. 2 shows a flowchart of a communication process on an MFP of a first embodiment.

(Communication Process on MFP; FIG. 2)

Next, the contents of processes executed by the CPU 32 of the MFP 10 according to the program 36 will be described with reference to FIG. 2. When the power of the MFP 10 is turned ON, in S10 the CPU 32 shifts the state of the MFP 10 to the initial state in which the CE mode is active and the P2P mode and the R/W mode are not active.

As shown in S20, while the state of the MFP 10 is the initial state, the CPU 32 monitors whether a communication link of MFP (CE)-NFC device (R) is established. As described above, in case of receiving information indicating that the NFC device is operating in the Reader mode, the CPU 32 determines that the communication link of MFP (CE)-NFC device (R) has been established. In this case, the CPU 32 determines YES in S20, and proceeds to S22.

In S22, using the communication link of MFP (CE)-NFC device (R), the CPU 32 sends URL (an abbreviation of Uniform Resource Locator) data to the NFC device via the NFC I/F 22. As described above, an internet server provided by the vendor of the MFP 10 stores the application for MFP and, in response to a request from an external device, permits the external device to download and install the application for MFP. The URL data sent in S22 represents a URL of the application for MFP (i.e., a file address of the application for MFP within the internet server). The URL data includes a Smart Poster command that is defined by the NFC standard. The Smart Poster command is a command for causing the NFC device (i.e., the portable terminals 50, 52) to execute activation of the application for MFP. Moreover, an operation executed by the NFC device when the URL data is received will be described in detail later. When S22 ends, the CPU 32 proceeds to S24.

In S24, the CPU 32 disconnects the communication link of MFP (CE)-NFC device (R). Specifically, the CPU 32 performs a communication of a Deactivation command and an OK command. It is determined in the NFC standard that the Poll device sends the Deactivation command, i.e., the Listen device receives the Deactivation command. When S24 is executed, the NFC device is the Poll device, and the MFP 10 is the Listen device. Consequently, the CPU 32 receives the Deactivation command from the NFC device via the NFC I/F 22, and sends the OK command to the NFC device via the NFC I/F 22. Consequently, the communication link of MFP (CE)-NFC device (R) is disconnected.

Moreover, it can occur that, due to the NFC device moving away from the MFP 10, the distance between the MFP 10 and the portable terminal 50 becomes a distance in which NFC communication cannot be performed before the NFC device sends the Deactivation command to the MFP 10. In this case, in S24 the link is forcibly disconnected without performing a communication of the Deactivation command and the OK command. When S24 ends, the CPU 32 returns to S20.

As shown in S30, while the state of the MFP 10 is the initial state, the CPU 32 further monitors whether a communication link of MFP (CE)-NFC device (W) is established. As described above, in the case of receiving information indicating that the NFC device is operating in the Writer mode, the CPU 32 determines that the communication link of MFP (CE)-NFC device (W) has been established. In this case, the CPU 32 determines YES in S30, and proceeds to S32.

In S32, using the communication link of MFP (CE)-NFC device (W), the CPU 32 monitors whether a P2P activation command is received from the NFC device via the NFC I/F 22. The P2P activation command is a command for causing the MFP 10 to execute an activation of the P2P mode. The P2P activation command is a command prepared according to the application for MFP. That is, receiving the P2P activation command from the NFC device means that the application for MFP is active in the NFC device. In case of receiving the P2P activation command from the NFC device, the CPU 32 determines YES in S32, and proceeds to S34. On the other hand, in case of not receiving the P2P activation command from the NFC device (i.e., in case of receiving a command different from the P2P activation command, or in case of not receiving any command), the CPU 32 determines NO in S32, and proceeds to S24.

In S34, the CPU 32 performs a communication of the Deactivation command and the OK command, as in S24, and disconnects the communication link. Next, in S36, in accordance with the P2P activation command, the CPU 32 stops the CE mode and activates the P2P mode. Consequently, the CPU 32 can change the state of the MFP 10 from the initial state to a state in which the P2P mode is active and the R/W mode and the CE mode are not active. Moreover, as described above, receiving the P2P activation command from the NFC device means that the application for MFP is active in the NFC device. Consequently, the MFP 10 can change the state of the MFP 10 from the initial state to the state in which the P2P mode is active at an appropriate timing (i.e., a timing at which the application for MFP is active in the NFC device). Further, in S36, the CPU 32 does not maintain the state in which the CE mode is active, and stops the CE mode. Consequently, in S38, to be described, establishment of a communication link for the MFP 10 to operate in the CE mode can be suppressed, and a communication link in P2P is established appropriately. When S36 ends, the CPU 32 proceeds to S38.

In S38, the CPU 32 monitors whether a communication link of P2P is established. As described above, e.g., in case the MFP 10 is the Poll device, the CPU 32 sends an Activation command corresponding to the P2P mode to the NFC device and, in case of receiving an OK command from the NFC device, determines that a communication link of P2P has been established. In this case, the CPU 32 determines YES in S38, and proceeds to S40. Further, e.g., in case the MFP 10 is the Listen device, the CPU 32 receives an Activation command corresponding to the P2P mode from the NFC device and, in case of sending an OK command to the NFC device, determines that a communication link of P2P has been established. In this case, also, the CPU 32 determines YES in S38, and proceeds to S40.

In S40, using the communication link of P2P, the CPU 32 performs a two-way communication with the NFC device via the NFC I/F 22. Specifically, the CPU 32 performs a two-way communication of print request data and response data. The CPU 32 first receives the print request data from the NFC device via the NFC I/F 22. The print request data includes a print instructing command for causing the MFP 10 to execute the print function. Moreover, the print request data does not include print data, this being data of a print target.

As described above, the communication speed of a communication of the NFC scheme is slower than the communication speed of a network wireless communication. Consequently, if the communication of the NFC scheme is used as the communication of print data from the NFC device (i.e., the portable terminals 50, 52) to the MFP 10, the communication of the print data may require a long time. Consequently, in the present embodiment, the MFP 10 adopts a configuration in which the print data is received from the NFC device by using a network wireless communication. In order to adopt such a configuration, the NFC device must know a wireless setting for performing a network wireless communication with the MFP 10. Consequently, in case of receiving, from the NFC device, print request data that includes a print instructing command, the MFP 10 sends the wireless setting to the NFC device as response data indicating a response to the print instructing command.

That is, in S40, the CPU 32 reads the print instructing command included in the print request data, and identifies, from the memory 34, a wireless setting that is being used in the wireless network to which the MFP 10 currently belongs. In S40, the CPU 32 further generates response data that includes the identified wireless setting. In S40, using the communication link of P2P, the CPU 32 further sends the generated response data to the NFC device via the NFC I/F 22. Thereby, the NFC device can join the wireless network by using the wireless setting included in the response data. Consequently, the MFP 10 and the NFC device perform a network wireless communication instead of a communication of the NFC scheme, and can communicate the print data. That is, the MFP 10 can receive the print data from the NFC device and execute the print function. When S40 ends, the CPU 32 proceeds to S42.

In S42, the CPU 32 disconnects the communication link of P2P. For example, in case the MFP 10 is the Listen device, the CPU 32 receives a Deactivation command from the NFC device and sends an OK command to the NFC device, as in S24. Consequently, the communication link of P2P is disconnected. Further, e.g., in case the MFP 10 is the Poll device, the CPU 32 sends a Deactivation command to the NFC device, and receives an OK command from the NFC device. Consequently, the communication link of P2P is disconnected. Moreover, in case the NFC device moves away from the MFP 10 before a communication of the Deactivation command and the OK command is performed, in S42 the link may be forcibly disconnected without performing the communication of these commands. When S42 ends, the CPU 32 proceeds to S44.

In S44, the CPU 32 stops the P2P mode, and activates the CE mode. Consequently, the CPU 32 can change the state of the MFP 10 to the initial state from the state in which the P2P mode is active and the R/W mode and the CE mode are not active. According to this configuration, the MFP 10 can appropriately return the state of the MFP 10 to the initial state. When S44 ends, the CPU 32 returns to S20.

Figure 3:
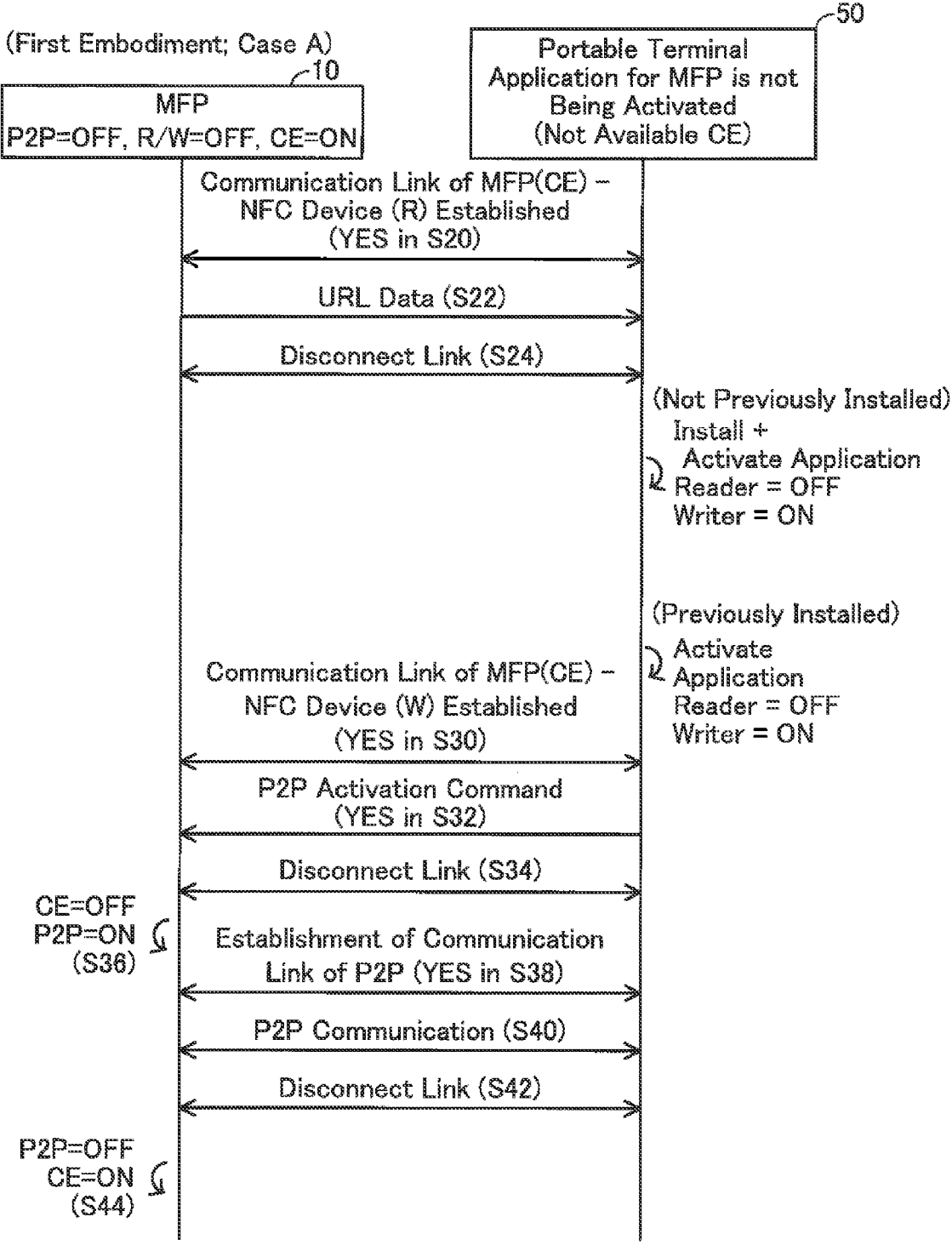
FIG. 3 shows a sequence chart of a communication of a case A of the first embodiment.

(Case A; FIG. 3)

Next, a specific case A realized by the present embodiment will be described with reference to FIG. 3. Case A is realized by the MFP 10 executing the processes of FIG. 2.

Case A1 shows a communication performed between the MFP 10 and the portable terminal 50 that comprises the first OS program. In the initial state of the MFP 10, the CE mode is active, and the P2P mode and the R/W mode are not active (i.e., P2P=OFF, R/W=OFF, CE=ON). Further, the application for MFP has not been installed in the portable terminal 50. Alternatively, the application for MFP has been installed in the portable terminal 50, but the application for MFP has not been activated. Consequently, in the initial state of the portable terminal 50, the P2P mode and the Reader mode are active, and the Writer mode is not active (i.e., P2P=ON, Reader=ON, Writer=OFF).

In a state where the application for MFP is not active, a user of the portable terminal 50 brings the portable terminal 50 closer to the MFP 10. The CE mode is active in the MFP 10, and the P2P mode and the Reader mode are active in the portable terminal 50. In such a situation, only a communication link of MFP (CE)-NFC device (R) can be established between the MFP 10 and the portable terminal 50 (S20 of FIG. 2). That is, a communication link of P2P, a communication link of MFP (CE)-NFC device (W), a communication link of the MFP (R)-NFC device (CE), and a communication link of MFP (W)-NFC device (CE) are not established.

In the case where the communication link of MFP (CE)-NFC device (R) is established (the case of YES in S20 of FIG. 2), the MFP 10 sends the URL data to the portable terminal 50 (S22). Next, the MFP 10 disconnects the communication link of MFP (CE)-NFC device (R) (S24).

Upon receiving the URL data from the MFP 10, the portable terminal 50 reads the Smart Poster command included in the URL data according to the first OS program. In case the application for MFP has not been installed in the portable terminal 50, a first example and a second example below are realized. In the first example, upon reading the Smart Poster command, the portable terminal 50 automatically accesses the URL included in the URL data (i.e., an internet server storing the application for MFP), and downloads the application for MFP from the internet server. Thereby, the portable terminal 50 can install the application for MFP. In the second example, upon reading the Smart Poster command, the portable terminal 50 displays a predetermined screen asking the user whether or not to access the URL included in the URL data. When the user permits access, the portable terminal 50 downloads the application for MFP from the internet server. Thereby, the portable terminal 50 can install the application for MFP. When the application for MFP is installed, the portable terminal 50 activates the application for MFP. Consequently, the portable terminal 50 stops the Reader mode, and activates the Writer mode.

Further, in a case where the portable terminal 50 has installed the application for MFP, the portable terminal 50 does not download the application for MFP even upon reading the Smart Poster command. Upon reading the Smart Poster command, the portable terminal 50, e.g., activates a predetermined application (browser application, etc.), and displays a predetermined screen showing the URL included in the URL data. When the user executes an operation via the predetermined screen to activate the application for MFP, the portable terminal 50 activates the application for MFP. Consequently, the portable terminal 50 stops the Reader mode, and activates the Writer mode.

The user of the portable terminal 50, in accordance with the screen for the application for MFP, applies an operation to the portable terminal 50 for causing the MFP 10 to perform the print function. The user brings the portable terminal 50 closer to the MFP 10. The CE mode is active in the MFP 10, and the P2P mode and the Writer mode are active in the portable terminal 50. In such a situation, only a communication link of MFP (CE)-NFC device (W) can be established between the MFP 10 and the portable terminal 50 (S30 of FIG. 2).

The portable terminal 50, in accordance with the application for MFP, sends the P2P activation command to the MFP 10 by using the communication link of MFP (CE)-NFC device (W). Consequently, by using the communication link of MFP (CE)-NFC device (W), the MFP 10 receives the P2P activation command from the portable terminal 50 (YES in S32). Next, the MFP 10 disconnects the communication link of MFP (CE)-NFC device (W) (S34).

The MFP 10, in accordance with the P2P activation command, stops the CE mode and activates the P2P mode (S36). The P2P mode is active in the MFP 10, and the P2P mode and the Writer mode are active in the portable terminal 50. In such a situation, only the communication link of P2P can be established between the MFP 10 and the portable terminal 50 (YES in S38 of FIG. 2). Moreover, in case of receiving the P2P activation command, the MFP 10 shifts to the state in which only the P2P mode is active (S36). However, the MFP 10 may shift to a state in which both the P2P mode and the R/W mode are active.

The portable terminal 50 generates print request data in accordance with the application for MFP. Using the communication link of P2P, the portable terminal 50 sends the print request data to the MFP 10. Consequently, using the communication link of P2P, the MFP 10 receives the print request data from the portable terminal 50 (S40). Next, using the communication link of P2P, the MFP 10 sends response data that includes the wireless setting to the portable terminal 50 (S40).

The portable terminal 50 receives the response data from the MFP 10 by using the communication link of P2P. Thereby, in accordance with the application for MFP, the portable terminal 50 joins the wireless network by using the wireless setting included in the response data. The portable terminal 50 performs a network wireless communication, sending the print data to the MFP 10.

The MFP 10 performs a network wireless communication, receiving print data from the portable terminal 50 (not shown in the flowchart and sequence chart). The print data is supplied to the print executing unit 18. Thereby, the MFP 10 (i.e., the print executing unit 18) prints an image represented by the print data onto a print medium.

Moreover, when the two-way communication of the print request data and the response data ends, the MFP 10 disconnects the communication link of P2P (S42). Next, the MFP 10 stops the P2P mode, and activates the CE mode (S44). Thereby, the MFP 10 returns to the initial state.

(Result of Present Embodiment)

If the MFP 10 were to adopt a configuration which maintains the state of the P2P mode being activated (called "configuration of comparative example" below), the following event could occur. In the portable terminal 50, the P2P mode is active even though the application for MFP is not active. Consequently, a communication link of P2P can be established between the MFP 10 and the portable terminal 50 even in a situation where the application for MFP is not active in the portable terminal 50. In this case, since the portable terminal 50 is not operating in accordance with the application for MFP, the portable terminal 50 does not send print request data to the MFP 10. That is, according to the configuration of the comparative example, it is possible that a two-way communication of the target data (i.e., the print request data and the response data) is not executed appropriately.

By contrast, in the present embodiment, in the initial state of the MFP 10, the CE mode is active and the P2P mode and the R/W mode are not active. Consequently, unlike the configuration of the comparative example, in a situation where the MFP 10 is in the initial state and the application for MFP is not active in the portable terminal 50, a communication link of P2P is not established between the MFP 10 and the portable terminal 50. Consequently, while in the initial state, the MFP 10 can appropriately establish the communication link of MFP (CE)-NFC device (R) (YES in S20 of FIG. 2). Then, using the communication link of MFP (CE)-NFC device (R), the MFP 10 sends the URL data to the portable terminal 50 (S22). Thereby, the MFP 10 can cause the portable terminal 50 to execute activation of the application for MFP.

Then, the MFP 10 changes the state of the MFP 10 from the initial state to the state in which the P2P mode is active (S36). Thereby, the communication link of P2P is established between the MFP 10 and the portable terminal 50. At this juncture, because the application for MFP is active in the portable terminal 50, the MFP 10 can perform a two-way communication of the target data with the portable terminal 50 by using the communication link of P2P. According to the present embodiment, unlike the configuration of the comparative example, the two-way communication of the target data can be executed appropriately.

Moreover, not only in a situation where the NFC device is the portable terminal 50, but also in a situation where the NFC device is the portable terminal 52, a communication similar to case A of FIG. 3 is performed, and a similar effect to that described above is obtained. That is, in case the application for MFP is not active in the portable terminal 52, the P2P mode, the Reader mode, and the CE mode are active and the Writer mode is not active. Consequently, in a situation where the MFP 10 is in the initial state and the application for MFP is not active in the portable terminal 52, a communication link of P2P is not established between the MFP 10 and the portable terminal 52. Consequently, while the MFP 10 is in the initial state, the MFP 10 can establish the communication link of MFP (CE)-NFC device (R) and send the URL data to the portable terminal 52. Subsequent communication is similar to the communication between the MFP 10 and the portable terminal 50 (case A of FIG. 3).

(Corresponding Relationships)

The MFP 10 and the portable terminals 50, 52 are respectively examples of "communication device" and "external device". The initial state of the MFP 10 (i.e., the state in which only the CE mode is active, and the P2P mode and the R/W mode are not active) is an example of "first state". The CE mode and the Reader mode are respectively examples of "first mode" and "second mode". The communication link of MFP (CE)-NFC device (R), the communication link of P2P, the communication link of MFP (CE)-NFC device (W) are respectively examples of "first type of communication link", "second type of communication link", and "third type of communication link". The URL data and the P2P activation command are respectively examples of "first data" and "second data". Further, the timing at which the P2P activation command is received is an example of "predetermined timing".

S20 and S30 of FIG. 2 are examples of "monitoring". S22, S32, S40 are respectively examples of "sending", "receiving" and "performing the two-way communication". S36, S44 are examples of "changing".

Second Embodiment

In the present embodiment, the initial state of the MFP 10 is different from the first embodiment. That is, in the initial state of the MFP 10, the Reader mode and the CE mode are active, and the P2P mode and the Writer mode are not active. Since the Reader mode is active in the MFP 10, the communication link of MFP (R)-NFC device (CE) can be established.

Further, the portable terminal 50 is different from the first embodiment in the point of being capable of using not only the P2P mode and the R/W mode, but also the CE mode. In the initial state of the portable terminal 50 (i.e., the state in which the application for MFP is not active), the P2P mode and the Reader mode are active, and the Writer mode and the CE mode are not active. When the application for MFP is activated in the portable terminal 50, the portable terminal 50 shifts from the initial state to a state in which the P2P mode, the Writer mode and the CE mode are active, and the Reader mode is not active.

The MFP 10 belongs to a wireless network that includes the AP 4 and the PC 6. Consequently, the MFP 10 can receive print data from the PC 6 via the AP 4, and perform printing in accordance with the print data. Moreover, the authentication card 54 is a card provided to a user of the PC 6. Even if the print data is received from the PC 6, the MFP 10 does not start printing until authentication using the authentication card 54 has succeeded. That is, after sending the print data from the PC 6 to the MFP 10, the user of the PC 6 brings the authentication card 54 closer to the MFP 10. The MFP 10 receives, from the authentication card 54, an authentication command that includes authentication information (e.g., user ID and password), and executes authentication. When the authentication succeeds, the MFP 10 starts printing. Thereby, the user of the PC 6 can obtain a printed matter when present near the MFP 10. That is, it is possible to suppress the printed matter being taken away by a third party.

Figure 4:
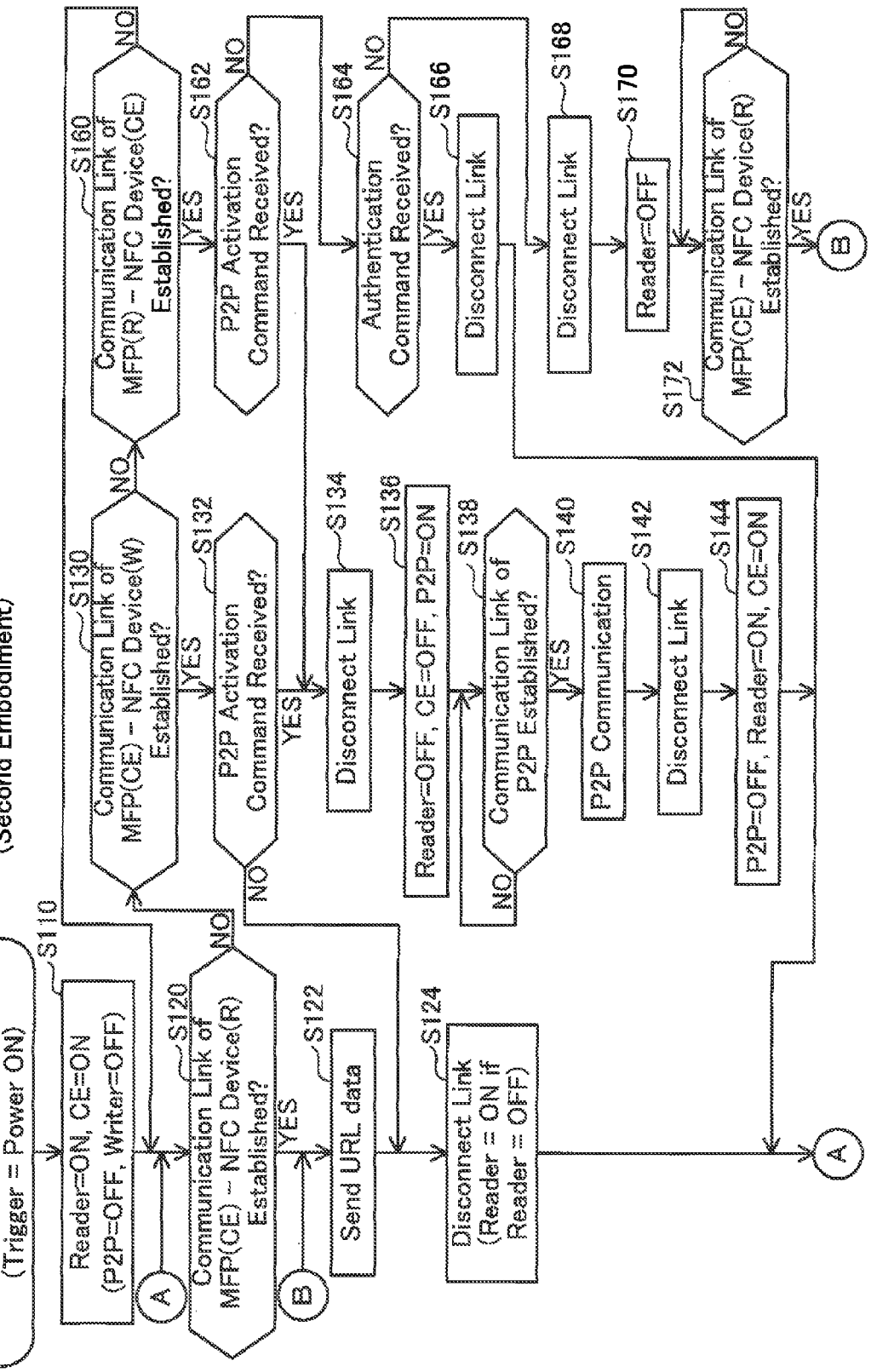
FIG. 4 shows a flowchart of a communication process on an MFP of a second embodiment.

(Communication Process on MFP; FIG. 4)

Next, contents of a communication process on the MFP 10 of the present embodiment will be described with reference to FIG. 4. When the power of the MFP 10 is turned ON, in S110 the CPU 32 shifts the state of the MFP 10 to the initial state in which the Reader mode and the CE mode are active, and the P2P mode and the Writer mode are not active.

S120 to S124 are similar to S20 to S24 of FIG. 2. However, in S124, in case the state of the MFP 10 is a state in which the Reader mode is not active (see S170, to be described), the CPU 32 activates the Reader mode. Thereby, the CPU 32 can appropriately return the state of the MFP 10 from the state in which the Reader mode is not active to the initial state in which the Reader mode is active.

S130 to S144 are similar to S30 to S44 of FIG. 2. However, in S136 the CPU 32, in accordance with the P2P activation command, stops the Reader mode and the CE mode, and activates the P2P mode. Consequently, the CPU 32 can change the state of the MFP 10 from the initial state to the state in which the P2P mode is active, and the R/W mode and the CE mode are not active. Further, in S144 the CPU 32 stops the P2P mode, and activates the Reader mode and the CE mode. Consequently, the CPU 32 can change the state of the MFP 10 to the initial state from the state in which the P2P mode is active, and the R/W mode and the CE mode are not active.

As shown in S160, while the state of the MFP 10 is the initial state, the CPU 32 further monitors whether the communication link of MFP (R)-NFC device (CE) is established. In case the MFP 10 executes the Poll operation and the information delivered from the NFC I/F 22 (i.e., information indicating the activation mode signal received from the NFC device that is the Listen device) indicates that the NFC device is activating the CE mode, the CPU 32 decides that the MFP 10 is to operate in the Reader mode. In this case, the CPU 32 sends an Activation command corresponding to the R/W mode to the NFC device, and receives an OK command from the NFC device. In case of receiving the OK command from the NFC device, the CPU 32 determines that a communication link of MFP (R)-NFC device (CE) has been established. In this case, the CPU 32 determines YES in S160, and proceeds to S162.

In S162, S164, by using the communication link of MFP (R)-NFC device (CE), the CPU 32 monitors whether a P2P activation command or an authentication command is received from the NFC device via the NFC I/F 22. In case of receiving the P2P activation command from the NFC device (i.e., the portable terminals 50, 52), the CPU 32 determines YES in S162, and proceeds to S134.

Moreover, in case the NFC device is the authentication card 54, the CPU 32 receives the authentication command from the NFC device (i.e., the authentication card 54). In this case, the CPU 32 determines YES in S164, and proceeds to S166. On the other hand, in the case of not receiving either the P2P activation command or the authentication command from the NFC device, the CPU 32 determines NO in S164, and proceeds to S168.

In S166, the CPU 32 sends a Deactivation command to the NFC device, and receives an OK command from the NFC device. Consequently, the communication link of MFP (R)-NFC device (CE) is disconnected. Moreover, in case the NFC device moves away from the MFP 10 before the communication of the Deactivation command and the OK command is performed, in S166 the link may be forcibly disconnected without executing the communication of these commands. Further, although not shown in the flowchart, in the case of receiving the authentication command, the CPU 32 executes authentication of the authentication information included in the authentication command and, in case of authentication succeeding, starts printing according to the print data. When S166 ends, the CPU 32 returns to S120. Moreover, in case of determining YES in S164, i.e., in case of receiving the authentication command from the NFC device, the CPU 32 does not stop the Reader mode, as in S170 (to be described). Consequently, the CPU 32 can appropriately maintain a state in which the Reader mode is active.

In S168, as in S166, the CPU 32 disconnects the communication link of MFP (R)-NFC device (CE). Next, in S170, the CPU 32 stops the Reader mode. Consequently, the CPU 32 can change the state of the MFP 10 from the initial state to the state in which the CE mode is active and the P2P mode and the R/W mode are not active. Thereby, in S172 (to be described), establishment of a communication link for the MFP 10 to operate in the Reader mode can be suppressed, and a communication link for the MFP 10 to operate in the CE mode can be established appropriately. When S170 ends, the CPU 32 proceeds to S172.

In S172, as in S120, the CPU 32 monitors whether the communication link of MFP (CE)-NFC device (R) is established. In case the communication link of MFP (CE)-NFC device (R) is established, the CPU 32 determines YES in S172, and proceeds to S122. Moreover, as described above, in case of executing S124, which is executed via S170, S172, and S122, in S124 the CPU 32 re-activates the Reader mode, which was stopped in S170, and returns the MFP 10 to the initial state.

Figure 5:
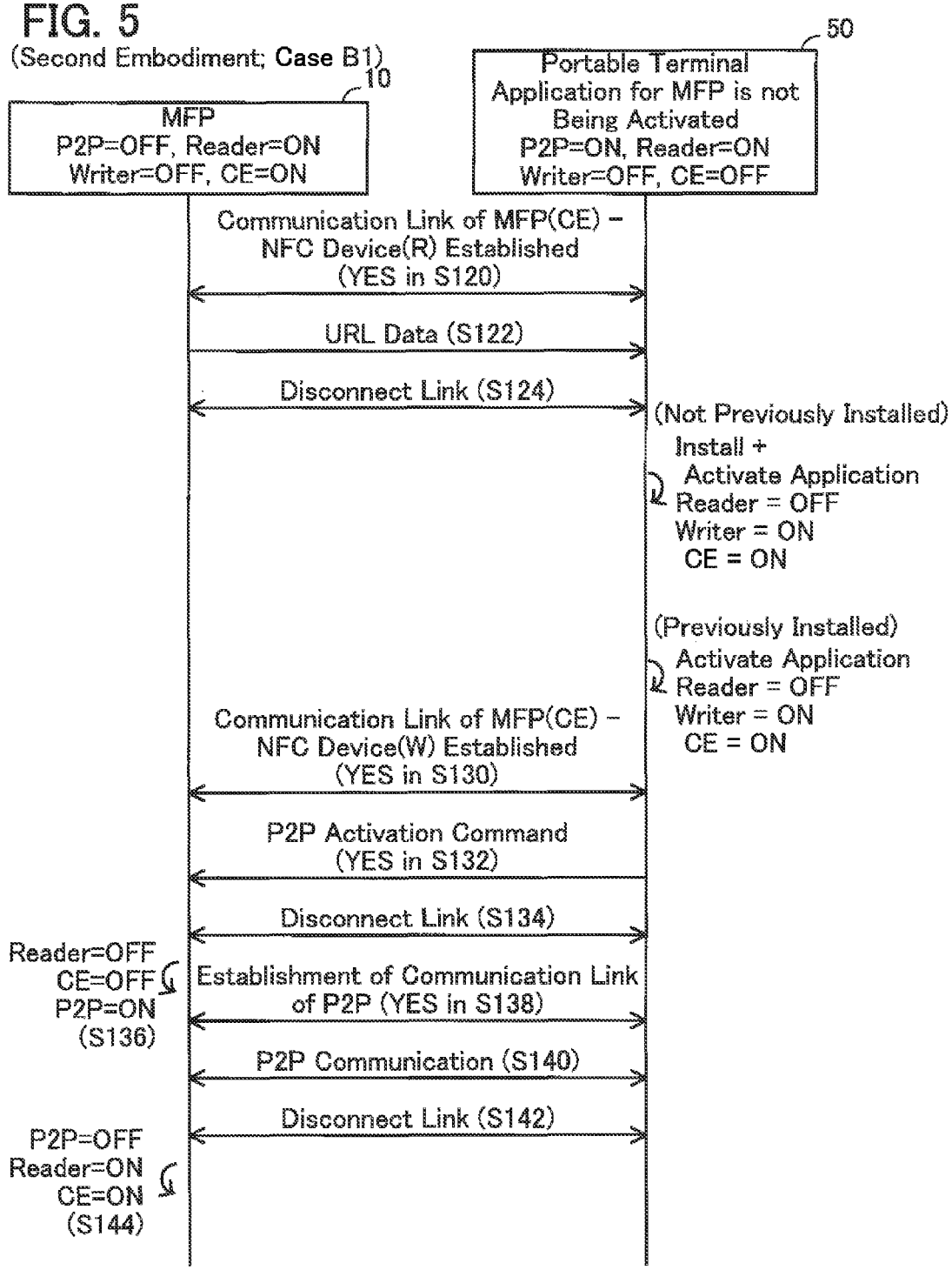
FIG. 5 shows a sequence chart of a communication of a case B1 of the second embodiment.

(Case B1; FIG. 5)

Next, specific cases B1 to B4 realized by the present embodiment will be described with reference to FIG. 5 to FIG. 8. Cases B1 to B4 are realized by the MFP 10 executing the processes of FIG. 4.

Case B1 shows a communication performed between the MFP 10 and the portable terminal 50 that comprises the first OS program. In the initial state of the MFP 10, the Reader mode and the CE mode are active, and the P2P mode and the Writer mode are not active (i.e., P2P=OFF, Reader=ON, Writer=OFF, CE=ON). Further, in the initial state of the portable terminal 50 (i.e., the state in which the application for MFP is not active), the P2P mode and the Reader mode are active, and the Writer mode and the CE mode are not active (i.e., P2P=ON, Reader=ON, Writer=OFF, CE mode=OFF). In such a situation, only the communication link of MFP (CE)-NFC device (R) can be established between the MFP 10 and the portable terminal 50 (S120 of FIG. 4). Thereafter, processes until the portable terminal 50 activates the application for MFP are similar to case A of FIG. 3.

When the application for MFP has been activated, the portable terminal 50 stops the Reader mode, and activates the Writer mode and the CE mode. In such a situation, the communication link of MFP (CE)-NFC device (W), or the communication link of MFP (R)-NFC device (CE) can be established between the MFP 10 and the portable terminal 50 (S130 or S160 of FIG. 4). In case B1, the communication link of MFP (CE)-NFC device (W) is established (YES in S130). Subsequent processes are similar to case A of FIG. 3, with the exception of the points that, in S136 not only the CE mode, but also the Reader mode is stopped in the MFP 10, and in S144 not only the CE mode, but also the Reader mode is activated in the MFP 10.

Figure 6:
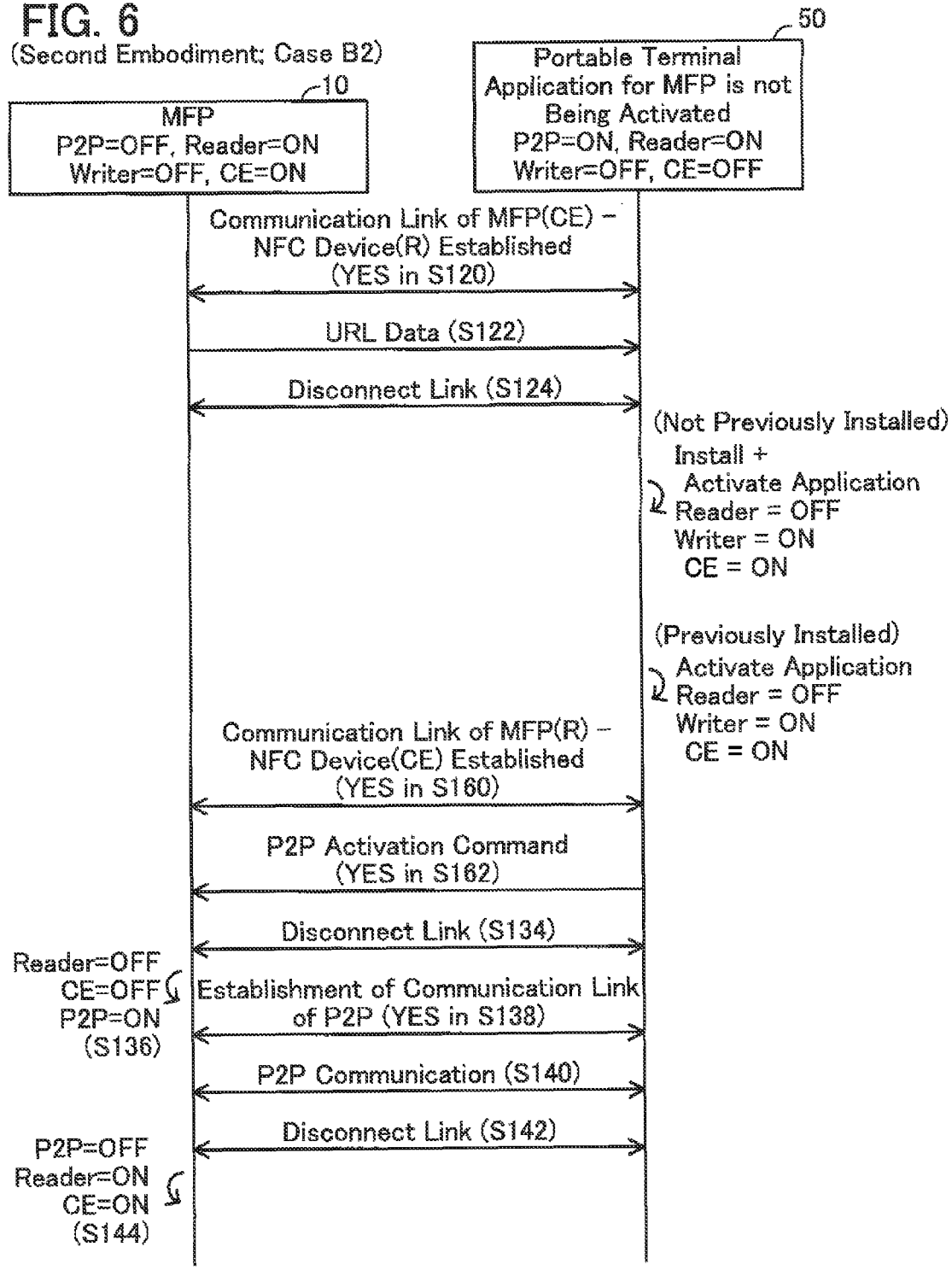
FIG. 6 shows a sequence chart of a communication of a case B2 of the second embodiment.

(Case B2; FIG. 6)

On the other hand, in case B2, after the portable terminal 50 has activated the application for MFP, the communication link of MFP (R)-NFC device (CE) is established (YES in S160 of FIG. 4). In this case, using the communication link of MFP (R)-NFC device (CE), the portable terminal 50 sends the P2P activation command to the MFP 10 in accordance with the application for MFP. Consequently, using the communication link of MFP (R)-NFC device (CE), the MFP 10 receives the P2P activation command from the portable terminal 50 (YES in S162). Subsequent processes are similar to case B1 of FIG. 5.

As shown in cases B1 and B2, while in the initial state, the MFP 10 can appropriately establish the communication link of MFP (CE)-NFC device (R) (YES in S120 of FIG. 4), and can send the URL data to the portable terminal 50 (S122). Thereby, the MFP 10 can cause the portable terminal 50 to execute the activation of the application for MFP. Then, the MFP 10 changes the state of the MFP 10 from the initial state to the state in which the P2P mode is active (S136). Thereby, using the communication link of P2P, the MFP 10 can appropriately perform a two-way communication of the target data with the portable terminal 50.

Further, after the portable terminal 50 has been caused to execute the activation of the application for MFP, the communication link of MFP (CE)-NFC device (W), or the communication link of MFP (R)-NFC device (CE) can be established (YES in S130 or YES in S160 of FIG. 4). Regardless of which communication link is established, the MFP 10 can receive the P2P activation command from the portable terminal 50 (YES in S132 or YES in S162), and can change the state of the MFP 10 from the initial state to the state in which the P2P mode is active at an appropriate timing (i.e., a timing at which the application for MFP is active in the portable terminal 50) (S136). Consequently, using the communication link of P2P, the MFP 10 can appropriately perform a two-way communication of the target data with the portable terminal 50.

Figure 7:
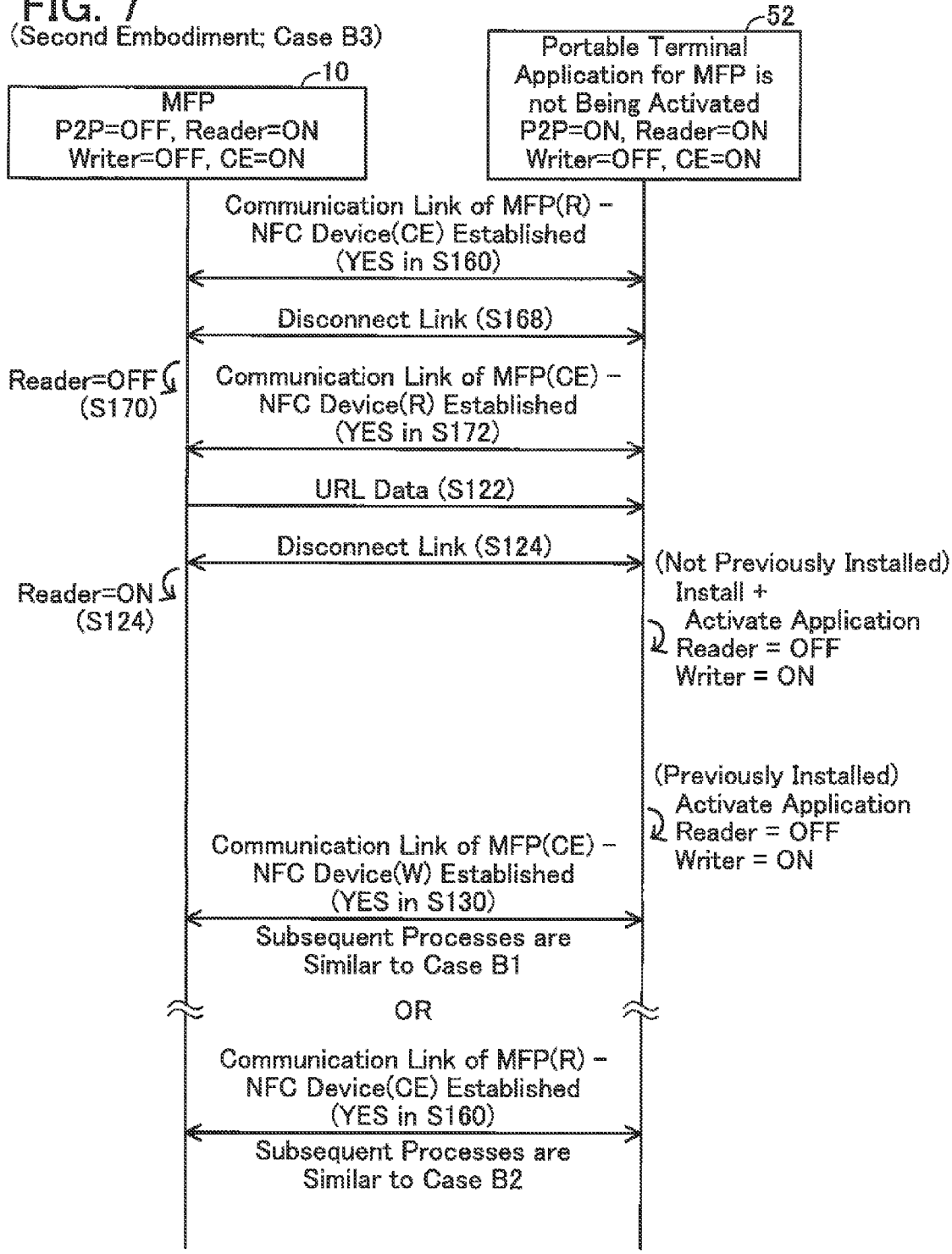
FIG. 7 shows a sequence chart of a communication of a case B3 of the second embodiment.

(Case B3; FIG. 7)

Case B3 shows a communication performed between the MFP 10 and the portable terminal 52 that comprises the second OS program. The initial state of the MFP 10 is similar to case B1 and B2 of FIG. 5 and FIG. 6. Further, in the initial state of the portable terminal 52 (i.e., the state in which the application for MFP is not active), the P2P mode, the Reader mode, and the CE mode are active, and the Writer mode is not active (i.e., P2P=ON, Reader=ON, Writer=OFF, CE mode=ON). In such a situation, the communication link of MFP (CE)-NFC device (R), or the communication link of MFP (R)-NFC device (CE) can be established between the MFP 10 and the portable terminal 52 (S120 or S160 of FIG. 4). In case the communication link of MFP (CE)-NFC device (R) is established (in case of YES in S120 of FIG. 4), subsequent processes in the portable terminal 52 are similar to cases B1 and B2 of FIG. 5 and FIG. 6, excepting for the point that the state in which the CE mode is active is maintained.

On the other hand, in case the communication link of MFP (R)-NFC device (CE) is established (in case of YES in S160 of FIG. 4), since the portable terminal 52 is not operating in accordance with the application for MFP, the portable terminal 52 does not send the P2P activation command to the MFP 10. Consequently, the MFP 10 does not receive the P2P activation command from the portable terminal 52 (NO in S162). Further, the MFP 10 does not receive the authentication command either (NO in S164). In this case, the MFP 10 disconnects the communication link of MFP (R)-NFC device (CE) (S168).

Next, the MFP 10 stops the Reader mode (S170). In such a situation, only the communication link of MFP (CE)-NFC device (R) can be established (S172). In case the communication link of MFP (CE)-NFC device (R) is established (in case of YES in S172), subsequent processes are similar to cases B1 and B2 of FIG. 5 and FIG. 6, excepting for the point that, when the communication link of MFP (CE)-NFC device (R) is disconnected, the Reader mode is activated in the MFP 10, and the point that, in the portable terminal 52, the state in which the CE mode is active is maintained.

As shown in case B3, the second OS program of the portable terminal 52 differs from the first OS program of the portable terminal 50, and activates the CE mode even though the application for MFP is not active. Consequently, even though the application for MFP is not active in the portable terminal 52, the communication link of MFP (R)-NFC device (CE) between the MFP 10 and the portable terminal 52 can be established (YES in S160). In this case, since the MFP 10 does not receive a P2P activation command from the portable terminal 52 (NO in S162, S164), the MFP 10 stops the Reader mode (S170). Since the Reader mode is stopped in S170, the communication link of MFP (CE)-NFC device (R) is established appropriately between the MFP 10 and the portable terminal 52 (YES in S172). Consequently, the MFP 10 can appropriately cause the portable terminal 52 to execute activation of the application for MFP (S122).

Figure 8:
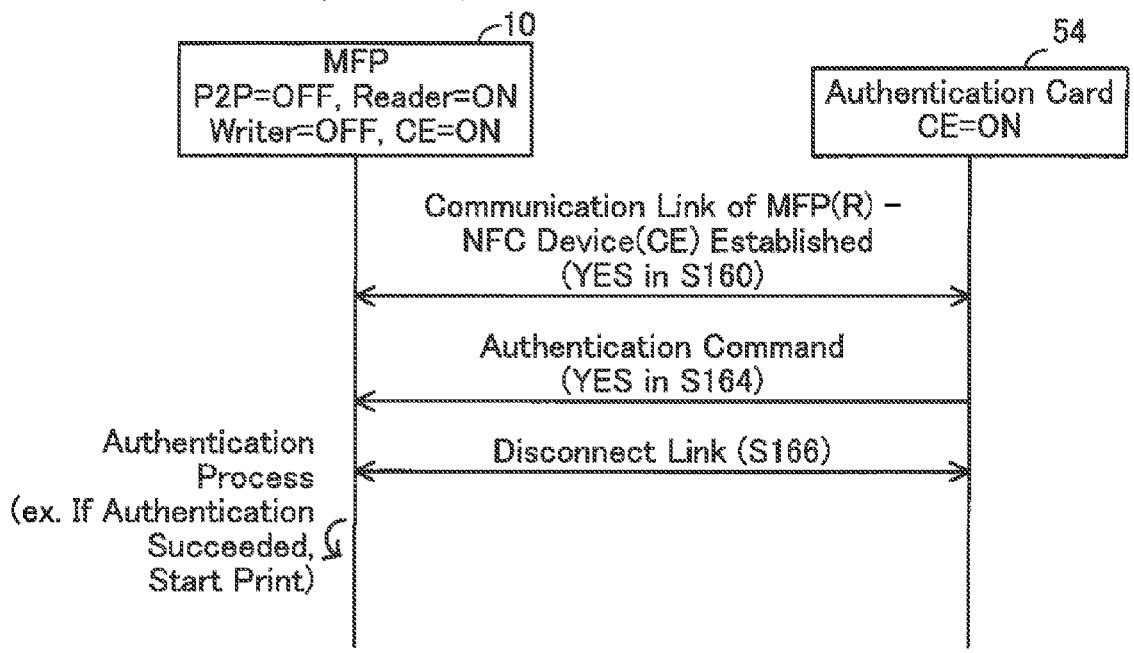
FIG. 8 shows a sequence chart of a communication of a case B4 of the second embodiment.

(Case B4; FIG. 8)

Case B4 shows a communication executed between the MFP 10 and the authentication card 54. The initial state of the MFP 10 is similar to cases B1 to B3 of FIG. 5 to FIG. 7. Further, only the CE mode is active in the authentication card 54. In such a situation, only the communication link of MFP (R)-NFC device (CE) can be established between the MFP 10 and the authentication card 54 (S160 of FIG. 4). In case the communication link of MFP (R)-NFC device (CE) is established (in case of YES in S160), the MFP 10 receives an authentication command from the authentication card 54 (YES in S164). Next, the MFP 10 disconnects the communication link of MFP (R)-NFC device (CE) (S166).

Moreover, the MFP 10 has received the print data from the PC 6 via the AP 4 before receiving the authentication command. Upon receiving the authentication command, the MFP 10 executes an authentication by using authentication information included in the authentication command. When the authentication succeeds, the MFP 10 starts printing according to the received print data.

As shown in case B4, in the initial state of the MFP 10, not only the CE mode, but also the Reader mode is active, and consequently the communication link of MFP (R)-NFC device (CE) is established between the MFP 10 and the authentication card 54 (S160). In this case, the MFP 10 receives an authentication command from the authentication card 54 (YES in S164), and can execute an authentication.

According to the present embodiment, while realizing a configuration that executes an authentication using the authentication card 54, the MFP 10 can appropriately perform a two-way communication of target data with the portable terminals 50, 52, as in cases B1 to B3.

(Corresponding Relationships)

Corresponding relationships of the second embodiment are basically similar to the corresponding relationships of the first embodiment. Points of difference are given below. The portable terminals 50, 52 and the authentication card 54 are an example of "external device". The initial state of the MFP 10 (i.e., the state in which the CE mode and the Reader mode are active, and the P2P mode and the Writer mode are not active) is an example of "first state". The state in which only the CE mode is active (i.e., the state after S170 of FIG. 4 has been executed) is an example of "third state". The authentication command is an example of "third data".

S120, S130, and S160 of FIG. 4 are examples of "monitoring". S122 is an example of "sending". S132, S162, and S164 are examples of "receiving". S140 is an example of "performing the two-way communication". S136, S144, S170, S124 are examples of "changing".

(Variant 1)

In the initial state of the MFP 10, the Writer mode is active, and the P2P mode, the Reader mode, and the CE mode need not be activated. Further, the initial state of the portable terminal 52 may be similar to the state shown in case B3 of FIG. 7. In this case, only a communication link of MFP (W)-NFC device (CE) can be established between the MFP 10 and the portable terminal 52. In case the communication link of MFP (W)-NFC device (CE) is established, the CPU 32 of the MFP 10 may send the URL data to the portable terminal 52 by using the communication link of MFP (W)-NFC device (CE). Thereby, the MFP 10 can cause the portable terminal 52 to execute an activation of the application for MFP. Then, the CPU 32 may change the state of the MFP 10 from the initial state to the state in which the P2P mode is active. In the present variant, also, the MFP 10 can appropriately cause the portable terminal 52 to execute an activation of the application for MFP, and consequently can appropriately execute a two-way communication of the target data with the portable terminal 52. In the present variant, the state in which only the Writer mode is active is an example of the "first state". The Writer mode and the CE mode are respectively examples of the "first mode" and the "second mode". The "first state" may be e.g., a state in which the P2P mode is not active, and a first mode different from the P2P mode is active. Further, the communication link of MFP (W)-NFC device (CE) is an example of the "first type of communication link". The "first type of communication link" may be e.g., a communication link capable of performing a one-way communication of first data from the communication device to an external device.

(Variant 2)

In the above embodiments, the URL data which includes the Smart Poster command is an example of the "first data". Instead, e.g., in case the first OS program of the portable terminal 50 is Android (registered trademark) (e.g., in case of a program having version 4.0 or later) the "first data" may be data that includes an Android (registered trademark) application record. That is, in S22 of FIG. 2 or S122 of FIG. 4, the CPU 32 may send the application record instead of the URL data. The application record may not include the URL of the application for MFP, but include a package name (i.e., text information) of the application for MFP. The portable terminal 50 can install and activate the application for MFP by using the package name included in the application record. In the present variant, the data that includes the application record is an example of the "first data".

(Variant 3)

In the portable terminals 50, 52, assuming that the application for MFP has been installed, data that includes an activation command of the application for MFP (not including an URL) may be adopted, instead of the URL data, as the "first data". That is, in general terms, the "first data" may be any data that includes a command for causing an external device to activate a particular application for performing a two-way communication of target data.

(Variant 4)

In the above embodiments, the timing at which the P2P activation command is received is an example of the "predetermined timing". Instead, the CPU 32 may activate the P2P mode at a timing when a predetermined time has elapsed since the URL data was sent to the portable terminals 50, 52 (e.g., a timing when an estimated time has elapsed that is required for the application for MFP to be activated in the portable terminals 50, 52). According to this configuration, the timing when the predetermined time has elapsed is an example of the "predetermined timing". The "changing" may be any step in which the state of the communication device changes from the first state to the second state at a predetermined timing after sending the first data. Moreover, in the present variant, S36 to S44 may be executed in FIG. 2 after S24 has been executed, without executing S30 to S34. In general terms, the processor may be any processor that performs at least the monitoring step (e.g., S20), the sending step (e.g., S22), the first changing step (e.g., S36), and the communication step (e.g., S40).

(Variant 5)

In the above embodiments, the state in which the P2P mode is active and the CE mode and the R/W mode are not active (i.e., the state after S36 or S136 of FIG. 2 or FIG. 4 has been executed) is an example of the "second state". Instead, the "second state" may be a state in which not only the P2P mode, but also at least one mode of the CE mode, the Reader mode, and the Writer mode is active. That is, the "second state" may be any state in which at least the P2P mode is active.

(Variant 6)

In the second embodiment, the authentication command is an example of the "third data". Instead, the "third data" may be another type of data (e.g., data regarding electronic money, etc.) to be communicated by the NFC scheme.

(Variant 7)

In the above embodiments, the print request data and the response data are an example of the "target data" of the target of the two-way communication. Instead, e.g., the variants below may be adopted.

(Variant 7-1)

Scan request data that includes a scan instructing command for causing the MFP 10 to execute the scan function, and response data which includes a wireless setting may be adopted as the "target data".

(Variant 7-2)

For example, a situation is assumed in which the portable terminal 50 should send, to the MFP 10, setting information to be used by the MFP 10. The following can be given as the setting information: e.g., print setting information (e.g., print resolution, paper size, etc.) for the MFP 10 to perform the print function, scan setting information (e.g., scan resolution, etc.) for the MFP 10 to perform the scan function, and communication setting information (e.g., IP address, subnet mask, gateway address, etc.) for the MFP 10 to perform a communication function. Thereby, the MFP 10 can perform the various functions by using the setting information received from the portable terminal 50. In case of receiving the setting information from the portable terminal 50, the MFP 10 sends a response command to the portable terminal 50, indicating that the setting information was received. The setting information and the response command may be adopted as the "target data".

(Variant 7-3)

For example, a situation is assumed in which the portable terminal 50 should send, to the MFP 10, address information that is included in an address book in the portable terminal 50. The MFP 10 can perform the communication function by using the address information received from the portable terminal 50. In case of receiving the address information from the portable terminal 50, the MFP 10 sends a response command to the portable terminal indicating that the address information was received. The address information and the response command may be adopted as the "target data".

(Variant 7-4)

In the above embodiments, a configuration is adopted in which the MFP 10 receives print data from the portable terminal 50 by using a network wireless communication. Instead, e.g., the MFP 10 may receive print data from the portable terminal 50 by using an NFC communication. In this case, the MFP 10 may send a response command to the portable terminal 50 indicating that the print data was received. The print data and the response command may be adopted as the "target data".

(Variant 7-5)

Further, in the above embodiments and the variants 7-1 to 7-4, the sending of target data from the portable terminal 50 to the MFP 10 is realized, and then the sending of the target data from the MFP 10 to the portable terminal 50 is realized. Instead, the sending of target data from the MFP 10 to the portable terminal 50 may be realized, and then the sending of the target data from the portable terminal 50 to the MFP 10 may be realized. That is, the "performing the two way-communication" may be any step that performs a two-way communication of the target data.

(Variant 8)

The "communication device" is not restricted to a multi-function peripheral capable of executing the print function and the scan function (i.e., the MFP 10), but may be a printer that is capable of executing only the print function from among the print function and the scan function, or may be a scanner that is capable of executing only the scan function from among the print function and the scan function. Further, the "communication device" may be a device that executes a function different from the print function and the scan function (e.g., an image display function, a data calculation function) (e.g., PC, server, portable terminal (portable telephone, smart phone, PDA, etc.)). That is, the "communication device" includes any device capable of performing a communication of the NFC scheme. Further, the "external device" is not restricted to the portable terminals 50, 52 and the authentication card 54, but includes any device capable of performing a communication of the NFC scheme.

(Variant 9)

In the above embodiments, the processes of FIG. 2 or FIG. 4 are realized by software (i.e., the program 36), but at least one of the processes of FIG. 2 or FIG. 4 may be realized by hardware such as a logic circuit, etc.

What is claimed is:

1. A communication device configured to perform a two-way communication with an external device according to an NFC (Near Field Communication) scheme complying with an NFC standard, the communication device comprising:
    an NFC interface configured to operate in the NFC scheme;
    a processor; and
    a memory configured to store computer executable instructions,
        wherein the computer executable instructions, when executed by the processor, cause the communication device to execute:
            in a case where a communication link via the NFC interface has been established between the communication device and the external device, sending first data to the external device by using the communication link, the first data configured to be stored in a memory of the external device and to cause the external device to activate a particular application, the particular application configured to perform a two-way communication of target data;
            in a case where a first type of communication link via the NFC interface has been established between the communication device and the external device while the communication device is in a first state in which a P2P (Peer to Peer) mode of the NFC standard is not active and a first mode of the NFC standard is active, receiving second data from the external device by using the first type of communication link, the second data configured to cause the communication device to activate the P2P mode, the first mode of the NFC standard being one of a CE (Card Emulation) mode and a Reader mode, the first type of communication link being for performing a data communication between the communication device operating in the first mode different from the P2P mode and the external device;
            in a case where the second data is received from the external device, changing a state of the communication device from the first state to a second state in which the P2P mode is active; and
            after the second data has been received from the external device, after the first type of communication link has been disconnected, and after changing the state of the communication device from the first state to the second state, in a case where a second type of communication link via the NFC interface is established between the communication device and the external device while the communication device is in the second state, performing, by using the second type of communication link, the two-way communication of the target data with the external device in which the particular application is active, the second type of communication link configured to provide a data communication between the communication device operating in the P2P mode different from the first mode and the external device operating in the P2P mode.

2. The communication device as in claim 1, wherein the computer executable instructions cause the communication device to further execute:
    changing the state of the communication device from the second state to the first state after the two-way communication of the target data by using the second type of communication link is completed.

3. The communication device as in claim 1, wherein
in the first state, the Reader mode of the NFC standard in active, and
the first type of communication link is a communication link in which the communication device is operating in the Reader mode.

4. The communication device as in claim 1, wherein
in the second state, at least one of the CE mode, the Reader mode, and a Writer mode of the NFC standard is active.

5. The communication device as in claim 1, wherein:
in a first case where the external device is a portable terminal and the first type of communication link via the NFC interface is established between the communication device and the external device while the communication device is in the first state, the second data is received from the external device, and
in a second case where the external device is an authentication card and the first type of communication link via the NFC interface is established between the communication device and the external device while the communication device is in the first state, the second data is not received from the external device.

6. The communication device as in claim 5, wherein
the computer executable instructions cause the communication device to further execute:
in the second case, receiving third data from the authentication card by using the first type of communication link, the third data being used for an authentication of the authentication card.

7. The communication device as in claim 6, wherein
the computer executable instructions cause the communication device to further execute:
in the first case, disconnecting the first type of communication link after receiving the second data from the portable terminal, wherein the state of the communication device is changed from the first state to the second state after the first type of communication link is disconnected due to receiving the second data from the portable terminal; and
in the second case, disconnecting the first type of communication link after receiving the third data from the authentication card, wherein the state of the communication device is maintained in the first state after the first type of communication link is disconnected due to receiving the third data from the authentication card.

8. A communication device configured to perform a two-way communication with an external device according to an NFC (Near Field Communication) scheme complying with an NFC standard, the communication device comprising:
an NFC interface configured to operate in the NFC scheme;
a first communication module configured to:
in a case where a communication link via the NFC interface has been established between the communication device and the external device, send first data to the external device by using the communication link, the first data configured to be stored in a memory of the external device and to cause the external device to activate a particular application, the particular application configured to perform a two-way communication of target data; and
in a case where a first type of communication link via the NFC interface has been established between the communication device and the external device while the communication device is in a first state in which a P2P (Peer to Peer) mode of the NFC standard is not active and a first mode of the NFC standard is active, receive second data from the external device by using the first type of communication link, the second data configured to cause the communication device to activate the P2P mode, the first mode of the NFC standard being one of a CE (Card Emulation) mode and a Reader mode, the first type of communication link being for performing a data communication between the communication device operating in the first mode different from the P2P mode and the external device;
a state change module configured to, in a case where the second data is received from the external device, change a state of the communication device from the first state to a second state in which the P2P mode is active; and
a second communication module configured to, after the second data has been received from the external device, after the first type of communication link has been disconnected, and after changing the state of the communication device from the first state to the second state, in a case where a second type of communication link via the NFC interface is established between the communication device and the external device while the communication device is in the second state, perform, by using the second type of communication link, the two-way communication of the target data with the external device in which the particular application is active, the second type of communication link configured to provide a data communication between the communication device operating in the P2P mode different from the first mode and the external device operating in the P2P mode.

9. A non-transitory computer readable medium storing computer readable instructions that, when executed, cause a communication device, configured to perform a two-way communication with an external device according to an NFC (Near Field Communication) scheme complying with an NFC standard, to:
in a case where a communication link via an NFC interface of the communication device has been established between the communication device and the external device, send first data to the external device by using the communication link, the first data configured to be stored in a memory of the external device and to cause the external device to activate a particular application, the particular application configured to perform a two-way communication of target data;
in a case where a first type of communication link via the NFC interface has been established between the communication device and the external device while the communication device is in a first state in which a P2P (Peer to Peer) mode of the NFC standard is not active and a first mode of the NFC standard is active, receive second data from the external device by using the first type of communication link, the second data configured to cause the communication device to activate the P2P mode, the first mode of the NFC standard being one of a CE (Card Emulation) mode and a Reader mode, the first type of communication link being for performing a data communication between the communication device operating in the first mode different from the P2P mode and the external device;

in a case where the second data is received from the external device, change a state of the communication device from the first state to a second state in which the P2P mode is active; and after the second data has been received from the external device, after the first type of communication link has been disconnected, and after changing the state of the communication device from the first state to the second state, in a case where a second type of communication link via the NFC interface is established between the communication device and the external device while the communication device is in the second state, perform, by using the second type of communication link, the two-way communication of the target data with the external device in which the particular application is active, the second type of communication link configured to provide a data communication between the communication device operating in the P2P mode different from the first mode and the external device operating in the P2P mode.

* * * * *